(12) United States Patent
Jun et al.

(10) Patent No.: US 12,321,553 B2
(45) Date of Patent: Jun. 3, 2025

(54) ELECTRONIC DEVICE

(71) Applicant: Samsung Display Co., Ltd., Yongin-si (KR)

(72) Inventors: Sanghyun Jun, Suwon-si (KR); Hwan-hee Jeong, Cheonan-si (KR); Kicheol Kim, Yongin-si (KR); Jaehyun Lee, Seoul (KR); Hyun-wook Cho, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/200,530

(22) Filed: May 22, 2023

(65) Prior Publication Data

US 2023/0297196 A1    Sep. 21, 2023

Related U.S. Application Data

(63) Continuation of application No. 17/827,770, filed on May 29, 2022, now Pat. No. 11,693,522, which is a (Continued)

(30) Foreign Application Priority Data

Jun. 5, 2017    (KR) .................. 10-2017-0069828

(51) Int. Cl.
*G06F 3/044* (2006.01)
*G06F 1/16* (2006.01)
*G06F 3/041* (2006.01)

(52) U.S. Cl.
CPC .......... *G06F 3/0443* (2019.05); *G06F 1/1643* (2013.01); *G06F 3/041* (2013.01);
(Continued)

(58) Field of Classification Search
CPC .... G02F 1/13338; G06F 1/1643; G06F 3/041; G06F 3/0412; G06F 3/0416;
(Continued)

(56) References Cited

U.S. PATENT DOCUMENTS 8,274,494 B2    9/2012    Frey et al.
9,201,555 B2   12/2015    Anno
(Continued)

FOREIGN PATENT DOCUMENTS

CN    103513842    1/2014
CN    103713789    4/2014
(Continued)

OTHER PUBLICATIONS

Extended European Search Report dated Nov. 29, 2018, in European Patent Application No. 18174206.5.
(Continued)

*Primary Examiner* — Stacy Khoo
(74) *Attorney, Agent, or Firm* — Womble Bond Dickinson (US) LLP

(57) ABSTRACT

An electronic device includes a first electrode, a second electrode, and a third electrode. The first electrode includes a first boundary side extending in a direction. The second electrode includes a second boundary side extending in the direction. The third electrode is disposed between and spaced apart from the first electrode and the second electrode. The third electrode includes a first side facing the first boundary side and a second side facing the second boundary. The first side and the second side have shapes that are asymmetric to each other with respect to a center axis extending in the direction.

19 Claims, 29 Drawing Sheets

Related U.S. Application Data continuation of application No. 17/306,773, filed on May 3, 2021, now Pat. No. 11,347,357, which is a continuation of application No. 16/672,892, filed on Nov. 4, 2019, now Pat. No. 10,996,804, which is a continuation of application No. 15/964,449, filed on Apr. 27, 2018, now Pat. No. 10,466,823.

(52) U.S. Cl.
CPC .. *G06F 3/0412* (2013.01); *G06F 2203/04104* (2013.01); *G06F 2203/04112* (2013.01)

(58) Field of Classification Search
CPC .. G06F 3/041662; G06F 3/044; G06F 3/0443; G06F 3/0445; G06F 3/0446; G06F 3/0448; G06F 2203/04104; G06F 2203/04112; H10K 50/844; H10K 59/40
See application file for complete search history.

(56) References Cited

U.S. PATENT DOCUMENTS

| | | | |
|---|---|---|---|
| 9,898,151 B2 | 2/2018 | Sebastian et al. | |
| 10,152,171 B2 | 12/2018 | Kang et al. | |
| 10,216,048 B2 | 2/2019 | Matsushima | |
| 10,541,280 B1* | 1/2020 | Krah | G06F 3/0446 |
| 2009/0315854 A1 | 12/2009 | Matsuo | |
| 2010/0079393 A1 | 4/2010 | Dews | |
| 2010/0233930 A1 | 9/2010 | Ishida et al. | |
| 2011/0248953 A1 | 10/2011 | Lee et al. | |
| 2011/0279390 A1 | 11/2011 | Park et al. | |
| 2013/0050105 A1 | 2/2013 | Lee et al. | |
| 2014/0002378 A1 | 1/2014 | Kim et al. | |
| 2014/0098057 A1 | 4/2014 | Lee et al. | |
| 2014/0192010 A1 | 7/2014 | Lai et al. | |
| 2015/0029118 A1 | 1/2015 | Xu et al. | |
| 2015/0083568 A1* | 3/2015 | Park | H02H 9/046 200/600 |
| 2015/0091819 A1 | 4/2015 | Wang | |
| 2015/0109245 A1 | 4/2015 | Chou et al. | |
| 2015/0160760 A1 | 6/2015 | Sato | |
| 2015/0188538 A1 | 7/2015 | Huh et al. | |
| 2015/0363024 A1 | 12/2015 | Hayashi et al. | |
| 2016/0103526 A1 | 4/2016 | Sohn | |
| 2016/0124543 A1* | 5/2016 | Chu | G06F 3/0446 345/174 |
| 2017/0139525 A1 | 5/2017 | Jo et al. | |
| 2017/0147126 A1 | 5/2017 | Chiu et al. | |
| 2017/0228069 A1 | 8/2017 | Xie et al. | |
| 2018/0039360 A1* | 2/2018 | Akimoto | H10K 50/86 |
| 2020/0142543 A1 | 5/2020 | Xie et al. | |

FOREIGN PATENT DOCUMENTS

| | | | |
|---|---|---|---|
| CN | 104272232 | 1/2015 | |
| CN | 104375726 A * | 2/2015 | G06F 3/044 |
| CN | 102945098 | 5/2016 | |
| EP | 3144768 | 3/2017 | |
| EP | 3168722 | 5/2017 | |
| EP | 3173915 | 5/2017 | |
| JP | 2013-143045 | 7/2013 | |
| JP | 2013-152619 | 8/2013 | |
| JP | 2014-191465 | 10/2014 | |
| JP | 2016-099872 | 5/2016 | |
| KR | 10-2016-0146315 | 12/2016 | |
| KR | 10-2017-0058898 | 5/2017 | |
| WO | 2011/072499 | 6/2011 | |
| WO | 2014/133347 | 9/2014 | |
| WO | 2015/034192 | 3/2015 | |
| WO | 2017/032094 | 3/2017 | |
| WO | 2017/071415 | 5/2017 | |

OTHER PUBLICATIONS

Notice of Allowance dated Jul. 1, 2019, in U.S. Appl. No. 15/964,449.
Extended European Search Report dated Nov. 9, 2020, in European Patent Application No. 20170959.9.
Notice of Allowance dated Jan. 4, 2021, in U.S. Appl. No. 16/672,892.
Notice of Allowance dated Jan. 24, 2022, in U.S. Appl. No. 17/306,773.
Non-Final Office Action mailed Oct. 20, 2022, in U.S. Appl. No. 17/827,770.
Notice of Allowance dated Feb. 23, 2023, in U.S. Appl. No. 17/827,770.

* cited by examiner

ELECTRONIC DEVICE

CROSS-REFERENCE TO RELATED APPLICATIONS

This application is a Continuation of U.S. patent application Ser. No. 17/827,770, filed May 29, 2022, which is a Continuation of U.S. patent application Ser. No. 17/306,773, filed May 3, 2021, which issued as U.S. Pat. No. 11,347,357, which is a Continuation of U.S. patent application Ser. No. 16/672,892, filed Nov. 4, 2019, which issued as U.S. Pat. No. 10,996,804, which is a Continuation of U.S. patent application Ser. No. 15/964,449, filed Apr. 27, 2018, which issued as U.S. Pat. No. 10,466,823, which claims priority to and the benefit of Korean Patent Application No. 10-2017-0069828, filed Jun. 5, 2017, each of which is incorporated by reference for all purposes as if fully set forth herein.

BACKGROUND

Field

The disclosure generally relates to an electronic device, and, more particularly, to an electronic device with high touch sensitivity and high visibility.

Discussion

An electronic device may be activated by an electrical signal. Some electronic devices may include a touch panel, which is configured to sense a variety of inputs applied from the outside. To improve user convenience, the touch panel may be used alone or in conjunction with a display device for displaying an image. Typically, the electronic device includes a plurality of electrode patterns to which electrical signals for activating the electronic device are applied. A region in which the electrode patterns applied with the electrical signals are provided may be used to display information or to respond to a touch applied from the outside.

The above information disclosed in this section is only for understanding the background of the inventive concepts, and, therefore, may contain information that does not form prior art.

SUMMARY

Some exemplary embodiments are capable of providing an electronic device having high touch sensitivity regardless of its shape.

Some exemplary embodiments are capable of providing an electronic device that is configured to prevent (or at least reduce) the presence of a sensor from being recognized by a user through reflection of external light.

Additional aspects will be set forth in the detailed description which follows, and, in part, will be apparent from the disclosure, or may be learned by practice of the inventive concepts.

According to some exemplary embodiments, an electronic device includes a first electrode, a second electrode, and an third electrode. The first electrode includes a first boundary side extending in a direction. The second electrode includes a second boundary side extending in the direction and facing the first boundary side. The second electrode is spaced apart from the first electrode in an intersecting direction crossing the direction and is electrically disconnected from the first sensor electrode. The third electrode is disposed between the first boundary side and the second boundary side, and is spaced apart from the first electrode and the second electrode. The third electrode includes a first side facing the first boundary side and a second side facing the second boundary side. At least one of the first side and the second side includes a plurality of protruding patterns spaced apart from each other in the direction. The first side and the second side have shapes that are asymmetric to each other with respect to a center axis extending in the direction.

According to some exemplary embodiments, an electrode device includes a first sensor and a second sensor. The first sensor includes a plurality of sensor electrodes that are spaced apart from each other in a first direction and are electrically connected to each other. The second sensor includes a plurality of sensor electrodes that are spaced apart from each other in a second direction crossing the first direction and are electrically connected to each other. Each of the plurality of sensor electrodes of one of the first sensor and the second sensor includes a sensor part and a floating pattern portion. The sensor part is adjacent to another sensor electrode of the plurality of sensor electrodes. The floating portion is spaced apart from the another sensor electrode with the sensor part disposed therebetween. The floating portion is electrically disconnected from the sensor part.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
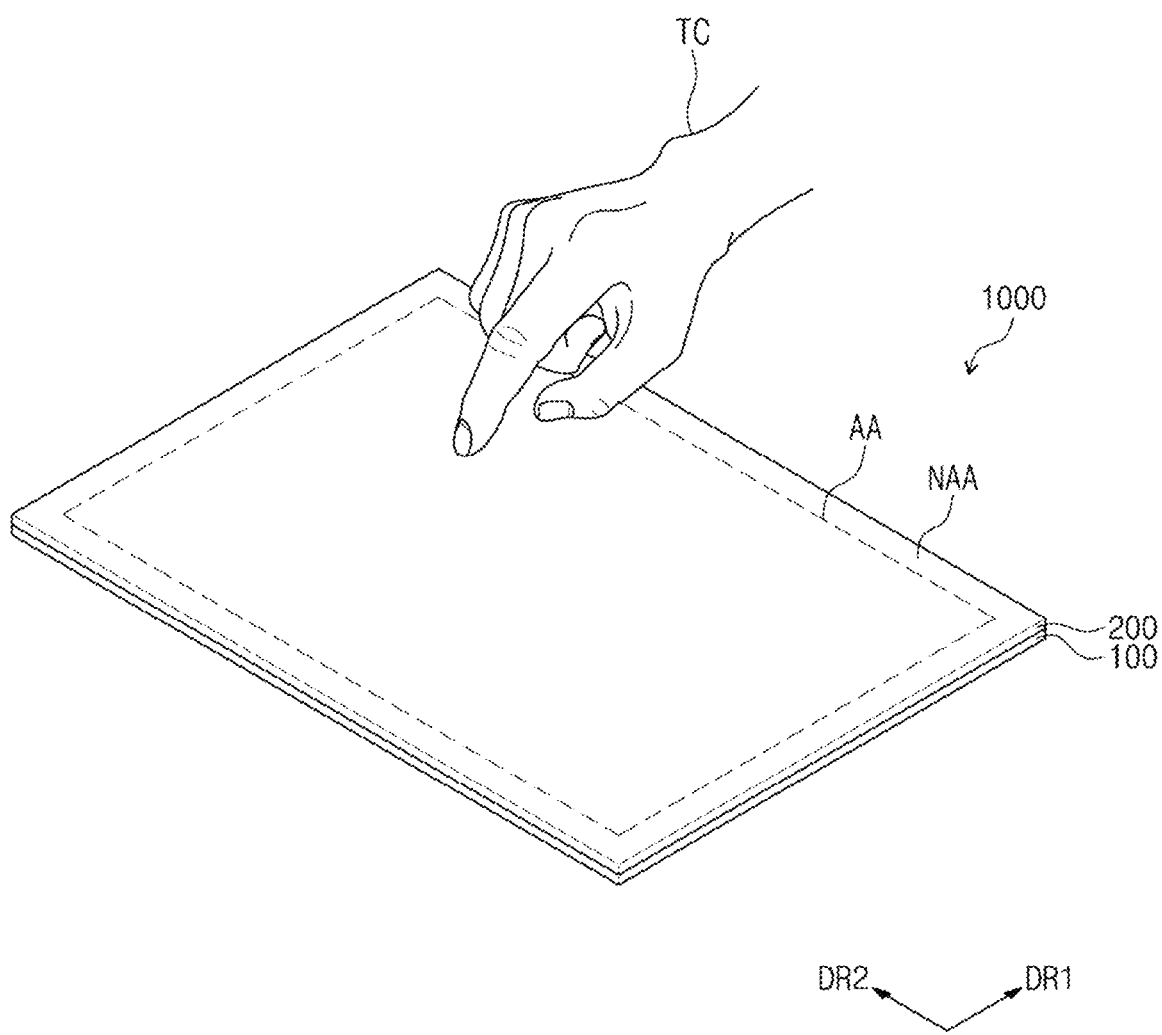
FIG. 1 is a perspective view schematically illustrating an electronic device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the spirit and scope of the inventive concepts. Further, the blocks, units, and/or modules of some exemplary embodiments may be physically combined into more complex blocks, units, and/or modules without departing from the spirit and scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the spirit and scope of the inventive concepts. Further, the blocks, units, and/or modules of some exemplary embodiments may be physically combined into more complex blocks, units, and/or modules without departing from the spirit and scope of the inventive concepts.

Figure 2:
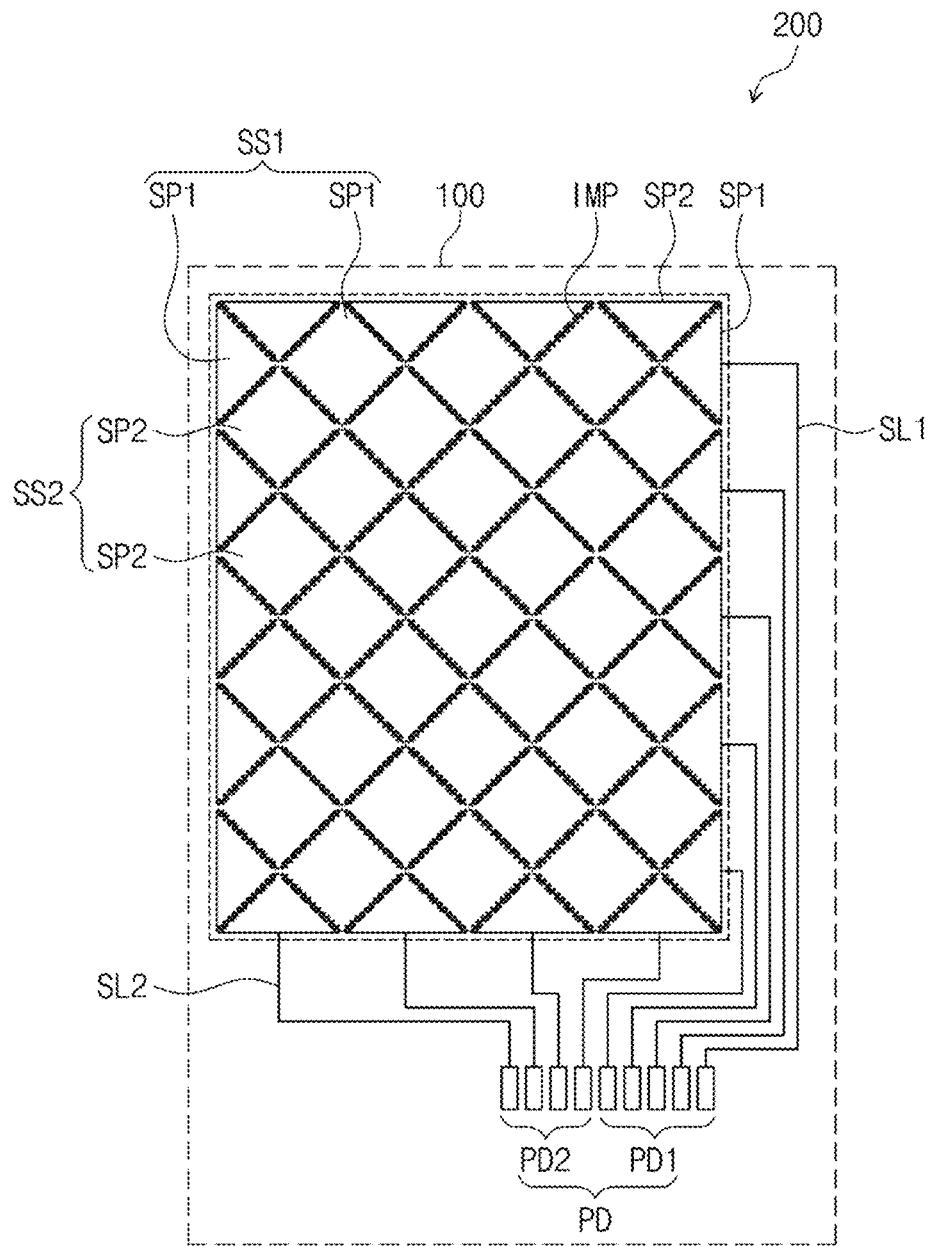
FIG. 2 is a plan view illustrating a portion of the electronic device of FIG. 1 according to some exemplary embodiments.

FIG. 1 is a perspective view schematically illustrating an electronic device according to some exemplary embodiments. FIG. 2 is a plan view illustrating a portion of the electronic device of FIG. 1 according to some exemplary embodiments. Hereinafter, an electronic device 1000 will be described with reference to FIGS. 1 and 2.

The electronic device 1000 may be configured to sense a touch TC applied from the outside. The touch TC may include various inputs that are provided to the electronic device 1000 from the outside. For example, the touch TC may include various types of an external input, such as at least one of a part of a user's body, a stylus pen, light, heat, and pressure. For convenience, a user's finger is illustrated and described as an example of the touch TC.

The electronic device 1000 may also be configured to sense a touch, which may occur when an object (e.g., a finger) is in contact with or adjacent to the electronic device 1000 or approaches the electronic device 1000. The electronic device 1000 may be configured to sense various types of input, but the inventive concepts are not limited to any specific one.

The electronic device 1000 may be divided into an active region AA and a peripheral region NAA, when viewed in a plan view, e.g., when viewed in a direction normal to a first direction DR1 and a second direction DR2. The active region AA may be activated to sense an external touch when, for instance, an electrical signal is applied thereto.

According to some exemplary embodiments, the active region AA may be defined to overlap a center of the electronic device 1000. However, the inventive concepts are not limited to this example. For example, in certain exemplary embodiments, depending on the usage mode of the electronic device 1000, the active region AA may be defined to be closer to an edge or a side of the electronic device 1000.

The peripheral region NAA may be defined to be adjacent to the active region AA, such as outside the active region AA. The electronic device 1000 may not detect an external touch applied to the peripheral region NAA.

FIG. 1 illustrates an example in which the peripheral region NAA is defined in the form of a frame surrounding the active region AA. However, the inventive concepts are not limited to this example, and the peripheral region NAA may have various shapes. In certain exemplary embodiments, the entire top surface of the electronic device 1000 may be defined as the active region AA, and the peripheral region NAA may be omitted.

The electronic device 1000 may include a base structure 100 and a touch structure 200. The base structure 100 may be used as a base layer on which the touch structure 200 is provided. For example, the base structure 100 may be an insulating substrate or an insulating film that is formed of an insulating material (e.g., at least one of glass and a polymer resin). In the case where the base structure 100 is an insulating substrate, the electronic device 1000 may have an increased hardness. In the case where the base structure 100 is an insulating film, the electronic device 1000 may have increased flexibility.

The base structure 100 may be a multi-layered structure in which a plurality of organic layers and/or a plurality of inorganic layers are stacked. This may allow the electronic device 1000 to have a slim structure. However, the inventive concepts are not limited to the aforementioned examples. For instance, the structure of the base structure 100 may be variously changed in an embodiment of the inventive concepts.

The touch structure 200 may be provided on one of various surfaces of the base structure 100. FIG. 1 illustrates an example in which the touch structure 200 is provided on a top surface of the base structure 100, but the inventive concepts are not limited thereto. For example, in certain exemplary embodiments, the touch structure 200 may be provided on a bottom surface of the base structure 100. In other exemplary embodiments, the touch structure may be provided on more than one surface of the base structure 100, such as the top and bottom surfaces of the base structure 100.

A touch applied from the outside may be mainly sensed by the touch structure 200. The touch structure 200 may include a plurality of first electrodes SP1 (below, first sensor electrodes SP1), a plurality of second electrodes SP2 (below, second sensor electrodes SP2), a plurality of first interconnection lines SL1, a plurality of second interconnection lines SL2, a plurality of first pads PD1, and a plurality of second pads PD2.

The first sensor electrodes SP1 may be arranged in the first direction DR1. The first sensor electrodes SP1 may be provided to form a plurality of rows arranged in the second direction DR2. The first sensor electrodes SP1 in each row may be electrically connected to each other through first connecting portions (not shown), thereby constituting a first sensor SS1. Accordingly, the first sensors SS1 may be arranged in the second direction DR2 and each of them may extend in the first direction DR1.

The second sensor electrodes SP2 may be arranged in the second direction DR2. The second sensor electrodes SP2 may be provided to form a plurality of columns arranged in the first direction DR1. The second sensor electrodes SP2 in each column may be electrically connected to each other through second connecting portions (not shown), thereby constituting a second sensor SS2. Accordingly, the second sensors SS2 may be arranged in the first direction DR1, and each of them may extend in the second direction DR2.

The number of the first sensor electrodes SP1 may be the same as or different from that of the second sensor electrodes SP2. The numbers of the first and second sensor electrodes SP1 and SP2 may be variously changed depending on a shape and an area of the active region AA.

The first and second sensors SS1 and SS2 may be provided to cross each other and may be electrically disconnected from each other, e.g., electrically insulated from one another. A variation in self-capacitance of each of the first and second sensors SS1 and SS2 or in mutual-capacitance between the first and second sensors SS1 and SS2 may be used to sense a touch applied from the outside. The active region AA may be a region in which the first and second sensor electrodes SP1 and SP2 are arranged.

The first and second interconnection lines SL1 and SL2 may be connected to the first and second sensors SS1 and SS2, respectively. The first interconnection lines SL1 may be connected to respective ones of the first sensors SS1 that are respectively provided at ends of the first sensors SS1, and the second interconnection lines SL2 may be connected to respective ones of the second sensors SS2 that are respectively provided at ends of the second sensors SS2.

The first pads PD1 may be connected to the first interconnection lines SL1, respectively, and the second pads PD2 may be connected to the second interconnection lines SL2, respectively. The first pads PD1 and the second pads PD2 may be electrically connected to a driving part (not shown) that is provided at the outside of the touch structure 200. The driving part may be configured to transmit or receive electrical signals to or from the touch structure 200 through the first and second pads PD1 and PD2. The electrical signals may include driving and power signals that are applied to the touch structure 200, and a sensing signal that is transmitted from the touch structure 200.

The first and second pads PD1 and PD2 are illustrated as being arranged in a line in the first direction DR1, but in some exemplary embodiments, the first and second pads PD1 and PD2 may be alternately arranged or may be arranged in a partially separated manner. In certain exemplary embodiments, the first and second pads PD1 and PD2 may be located at various positions of the touch structure 200, thereby forming various arrangements.

In an exemplary embodiment, the electronic device 1000 may further include a plurality of third electrodes IMP (below, auxiliary electrode IMP). The auxiliary electrodes IMP may be arranged between the first and second sensor electrodes SP1 and SP2.

Each of the auxiliary electrodes IMP may be arranged between the first and second sensor electrodes SP1 and SP2. Each of the auxiliary electrodes IMP may be electrically disconnected from not only the first sensor electrodes SP1 but also the second sensor electrodes SP2. The auxiliary electrodes IMP may be floating electrodes to which additional electrical signals from the outside are not applied. Accordingly, additional signal lines connected to the auxiliary electrodes IMP may not be provided.

Each of the auxiliary electrodes IMP may include a side, which is provided to face the first sensor electrodes SP1, and another side, which is provided to face the second sensor electrodes SP2. Here, the side facing the first sensor electrodes SP1 may have a shape different from the another side facing the second sensor electrodes SP2. This will be described in more detail below.

According to some exemplary embodiments, each of the first and second sensor electrodes SP1 and SP2 may include boundary sides, which are fittingly coupled with sides of each of the auxiliary electrodes IMP. Accordingly, a pair of the first and second sensor electrode SP1 and SP2, which face each other with the auxiliary electrode IMP interposed therebetween, may include sides having different shapes. This will be described in more detail below.

According to an exemplary embodiment, the electronic device 1000 may include the auxiliary electrodes IMP, each of which has two sides of different shapes. Since the auxiliary electrodes IMP are further provided in the electronic device 1000, it may be possible to improve the invisibility and touch sensitivity of the touch structure 200. This will be described in more detail below.

Figure 3A:
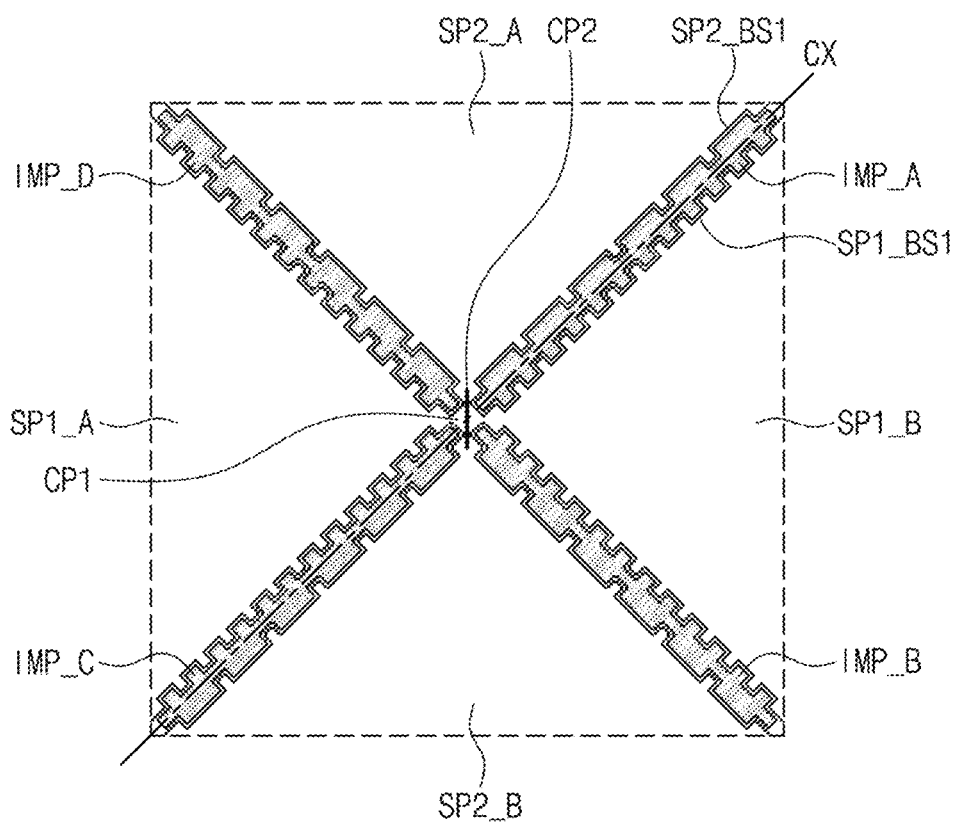
FIG. 3A is an enlarged plan view illustrating a region of FIG. 2 according to some exemplary embodiments.
Figure 3A:
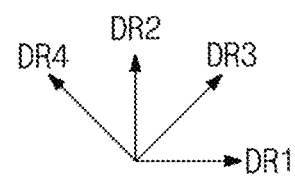
Figure 3B:
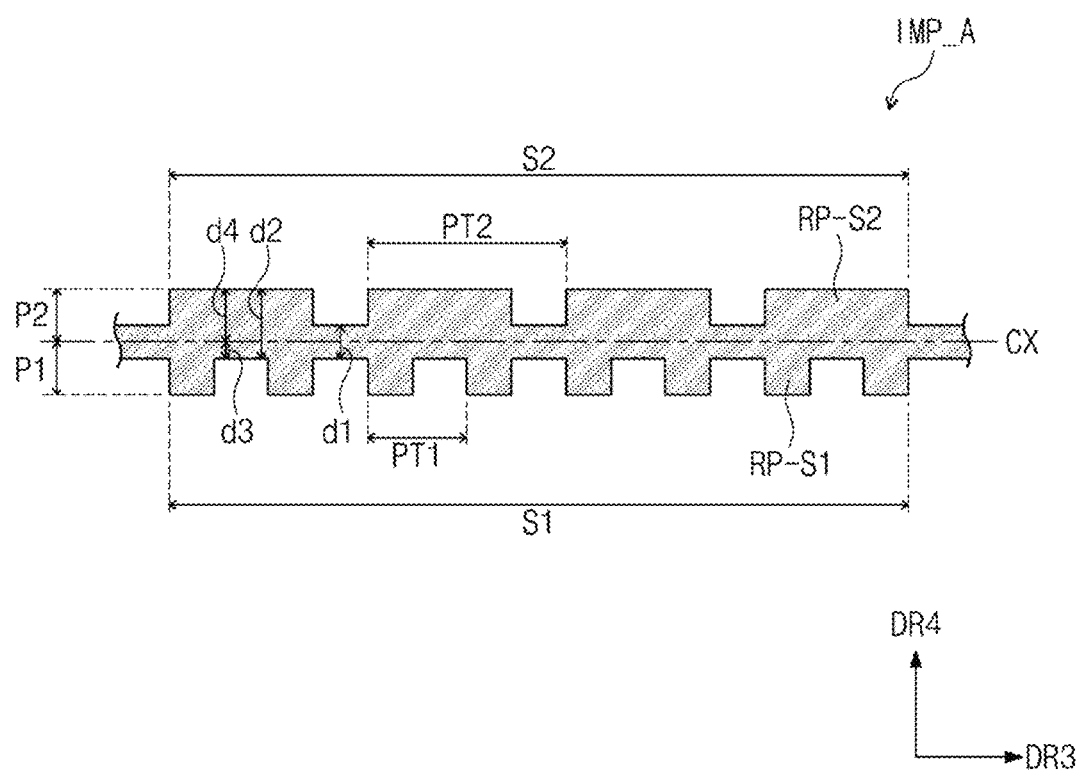
FIGS. 3B and 3C are plan views each illustrating a portion of the structure shown in FIG. 3A according to some exemplary embodiments.
Figure 3C:
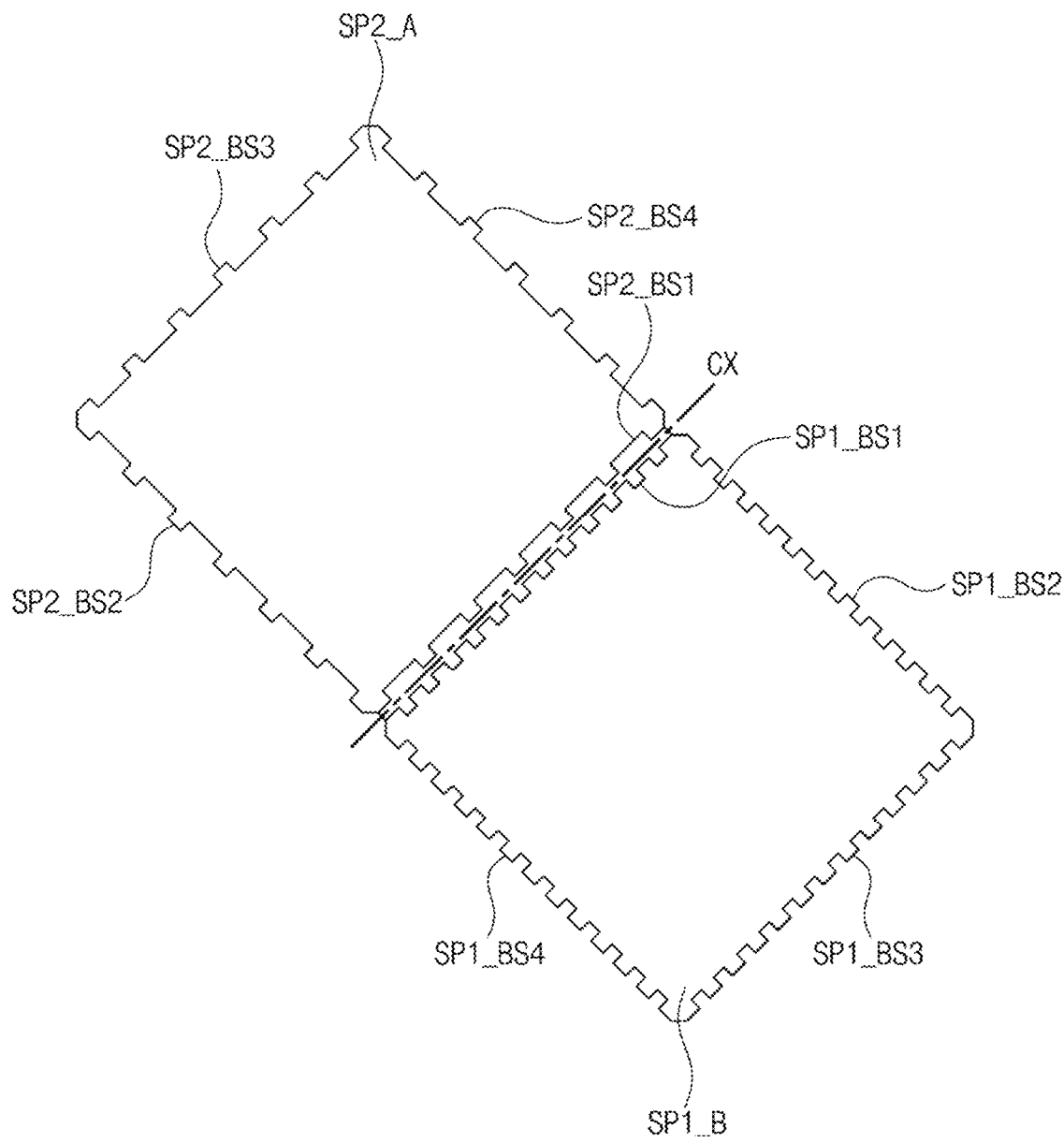

FIG. 3A is an enlarged plan view illustrating a region of FIG. 2 according to some exemplary embodiments, and FIGS. 3B and 3C are plan views each illustrating a portion of the structure shown in FIG. 3A according to some exemplary embodiments. For instance, FIG. 3A illustrates a region in which a pair of first sensor electrodes SP1_A and SP1_B and a pair of second sensor electrodes SP2_A and SP2_B are arranged. Here, the first sensor electrodes SP1_A and SP1_B may be two among the first sensor electrodes SP1 (e.g., see FIG. 2) that are connected to each other, and the second sensor electrodes SP2_A and SP2_B may be two among the second sensor electrodes SP2 (e.g., see FIG. 2) that are electrically disconnected from the first sensor electrodes SP1_A and SP1_B.

Hereinafter, the electronic device 1000 (e.g., of FIG. 1) according to some exemplary embodiments will be described with respect to FIGS. 3A to 3C. For concise description, an element previously described with reference to FIGS. 1 and 2 may be identified by a similar or identical reference number without repeating an overlapping description thereof.

As shown in FIG. 3A, the pair of the first sensor electrodes SP1_A and SP1_B may include a left first sensor electrode SP1_A and a right first sensor electrode SP1_B that are connected to each other in the first direction DR1, and the pair of the second sensor electrodes SP2_A and SP2_B may include an upper second sensor electrode SP2_A and a lower second sensor electrode SP2_B that are connected to each other in the second direction DR2. The left first sensor electrode SP1_A and the right first sensor electrode SP1_B may be connected to each other through a first connecting portion CP1 extending in the first direction DR1.

The upper second sensor electrode SP2_A and the lower second sensor electrode SP2_B may be connected to each other through a second connecting portion CP2 extending in the second direction DR2. In some exemplary embodiments, the first connecting portion CP1 may be provided on the same layer as that for the left first sensor electrode SP1_A and the right first sensor electrode SP1_B, and may be provided in the form of a single body with the left first sensor electrode SP1_A and the right first sensor electrode SP1_B.

The second connecting portion CP2 may be provided to cross over (e.g., overlap) the first connecting portion CP1 and may be electrically disconnected from the first connecting portion CP1, but the inventive concepts are not limited thereto. For example, in certain exemplary embodiments, the second connecting portion CP2 may be provided below the first connecting portion CP1 or may be provided on the same layer as that for the upper second sensor electrode SP2_A and the lower second sensor electrode SP2_B to form a single body with the upper second sensor electrode SP2_A and the lower second sensor electrode SP2_B. Even in such exemplary embodiments, the first connecting portion CP1 may be provided to cross the second connecting portion CP2 and may be electrically disconnected from the second connecting portion CP2.

The auxiliary electrodes IMP (e.g., see FIG. 2) may be placed between respective pairs of four sensor electrodes SP1_A, SP1_B, SP2_A, and SP2_B. In some exemplary embodiments, the auxiliary electrodes IMP may include first to fourth auxiliary electrodes IMP_A, IMP_B, IMP_C, and IMP_D, which are arranged in a clockwise direction.

For convenience, FIG. 3B illustrates the first auxiliary electrode IMP_A as an example of the auxiliary electrodes IMP. As shown in FIG. 3B, the first auxiliary electrode IMP_A may be an auxiliary electrode that is placed between a first boundary side SP1_BS1 of the right first sensor electrode SP1_B and a first boundary side SP2_BS1 of the upper second sensor electrode SP2_A.

The first auxiliary electrode IMP_A may extend in a third direction DR3, thereby having a length defined in the third direction DR3 and a width defined in a fourth direction DR4.

The first auxiliary electrode IMP_A may include a first side S1 and a second side S2 that extend in the third direction DR3 and face each other.

The first side S1 may be a side adjacent to the right first sensor electrode SP1_B. The second side S2 may be a side adjacent to the upper second sensor electrode SP2_A. Accordingly, the first side S1 may be a side facing the first boundary side SP1_BS1 of the right first sensor electrode SP1_B, and the second side S2 may be a side facing the first boundary side SP2_BS1 of the upper second sensor electrode SP2_A.

A width of the first auxiliary electrode IMP_A may vary along the third direction DR3. For example, the first auxiliary electrode IMP_A may have a first width d1 at a specific position, and may have a second width d2 at another position that is spaced apart from the specific position by a first width d1 in the third direction DR3. The variation in width of the first auxiliary electrode IMP_A in the third direction DR3 may be dependent on a shape of each of the first and second sides S1 and S2.

A center axis CX may be defined in the first auxiliary electrode IMP_A. The center axis CX may be a straight line extending in the third direction DR3. The center axis CX may pass through the first auxiliary electrode IMP_A. Considering that the first auxiliary electrode IMP_A has the varying width, the center axis CX may be defined to pass through centers of portions having the minimum width. Accordingly, the center axis CX may pass through centers of portions whose width is the first width d1.

In some exemplary embodiments, the first auxiliary electrode IMP_A may have an asymmetric shape with respect to the center axis CX. Here, symmetry means linear symmetry. For the purposes of this disclosure, the symmetry means symmetry that is viewed in the entirety of the first auxiliary electrode IMP_A, not symmetry at a specific position.

The first auxiliary electrode IMP_A may be divided into a first portion P1 and a second portion P2 with respect to the center axis CX. The first portion P1 and the second portion P2 may have asymmetric shapes to each other with respect to the center axis CX. For instance, the first portion P1 may include the first side S1, and the second portion P2 may include the second side S2. The first side S1 may have a shape different from that of the second side S2.

At least one of the first side S1 and the second side S2 may include a plurality of protruding patterns. In some exemplary embodiments, each of the first side S1 and the second side S2 may include first protruding patterns RP-S1 and second protruding patterns RP-S2.

The first protruding patterns RP-S1 may be patterns protruding in a direction from the center axis CX toward the right first sensor electrode SP1_B. The first protruding patterns RP-S1 may have a first pitch PT1. The first protruding patterns RP-S1 may be repeated in the third direction DR3 every first pitch PT1.

The second protruding patterns RP-S2 may be patterns protruding toward the upper second sensor electrode SP2_A. The second protruding patterns RP-S2 may be arranged to have a second pitch PT2. The second protruding patterns RP-S2 may be repeated in the third direction DR3 every second pitch PT2.

The first pitch PT1 and the second pitch PT2 may be different from each other. In some exemplary embodiments, the first pitch PT1 may be smaller than the second pitch PT2. As such, the first portion P1 may have portions whose width is different from a width of portions of the second portion P2. For example, a third width d3 and a fourth width d4 may be different from each other, even when the third and fourth widths d3 and d4 are measured from the same position of the center axis CX in the third direction DR3. Accordingly, first protruding patterns RP-S1 and second protruding patterns RP-S2 may be provided to be asymmetric with respect to the center axis CX.

According to some exemplary embodiments, the first portion P1 and the second portion P2 may have areas (e.g., surface areas) different from each other. Since the first auxiliary electrode IMP_A according to an embodiment of the inventive concept includes the first portion P1 and the second portion P2 that are different from each other in their pitch, shape, and area, it may be possible to realize an asymmetric shape with respect to the center axis CX.

In FIG. 3C, only the right first sensor electrode SP1_B and the upper second sensor electrode SP2_A are exemplarily illustrated. As shown in FIG. 3C, boundary sides of each of the right first sensor electrode SP1_B and the upper second sensor electrode SP2_A may have a shape that is engaged with the first side S1 or the second side S2 of a neighboring auxiliary electrode.

For example, the right first sensor electrode SP1_B may have first to fourth boundary sides SP1_BS1, SP1_BS2, SP1_BS3, and SP1_BS4, each of which has a shape that can be engaged with the first side S1. Also, the upper second sensor electrode SP2_A may have first to fourth boundary sides SP2_BS1, SP2_BS2, SP2_BS3, and SP2_BS4, each of which has a shape that can be engaged with the second side S2.

Accordingly, the right first sensor electrode SP1_B and the upper second sensor electrode SP2_A, which are provided adjacent to each other with the center axis CX interposed therebetween, may include boundary sides of different shapes. For instance, the first boundary side SP1_BS1 of the right first sensor electrode SP1_B and the first boundary side SP2_BS1 of the upper second sensor electrode SP2_A, which are provided adjacent to each other with the center axis CX of the first auxiliary electrode IMP_A interposed therebetween, may have shapes that are asymmetric to each other with respect to the center axis CX.

According to some exemplary embodiments, an electronic device may further include an auxiliary electrode having various shapes, and the auxiliary electrode between adjacent sensor electrodes may be designed in such a way that its two sides facing the sensor electrodes have different shapes. Furthermore, the shape of the auxiliary electrode may be designed to allow boundary sides of the sensor electrodes to have various shapes. Accordingly, it may be possible to increase a degree of freedom in designing the shape of the sensor electrodes.

Figure 4A:
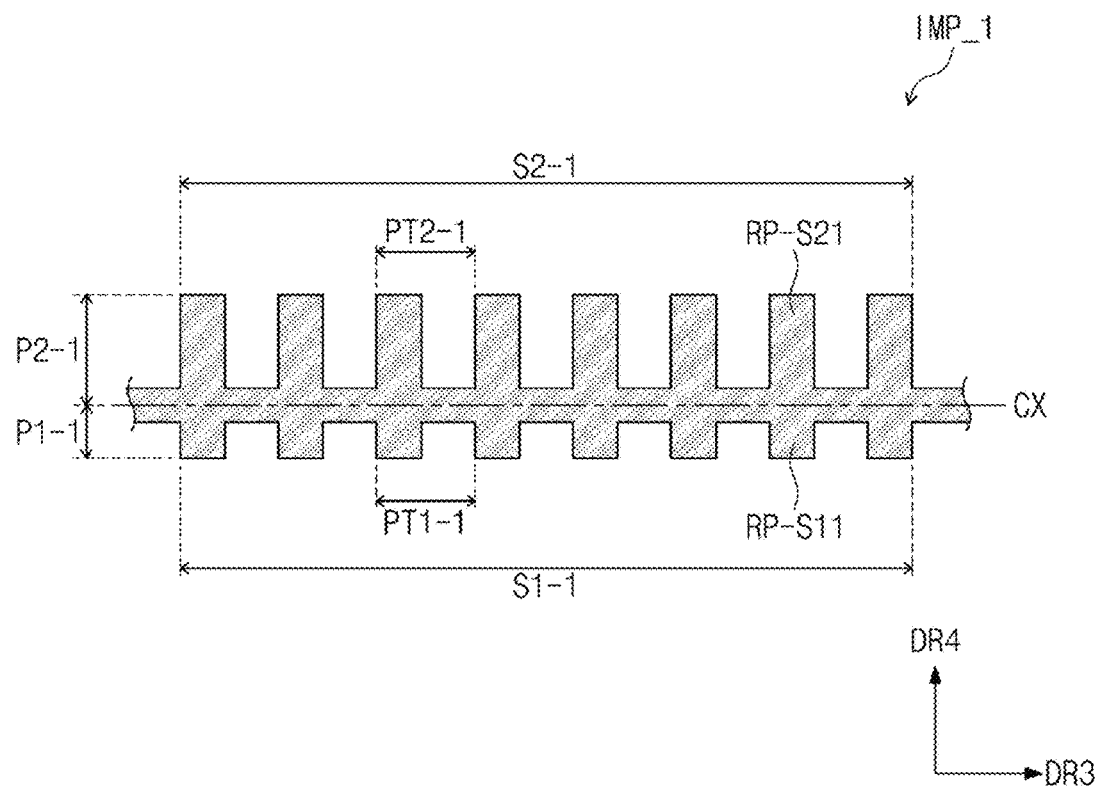
FIGS. 4A, 4B, and 4C are plan views each illustrating some auxiliary electrodes according to various exemplary embodiments.
Figure 4B:
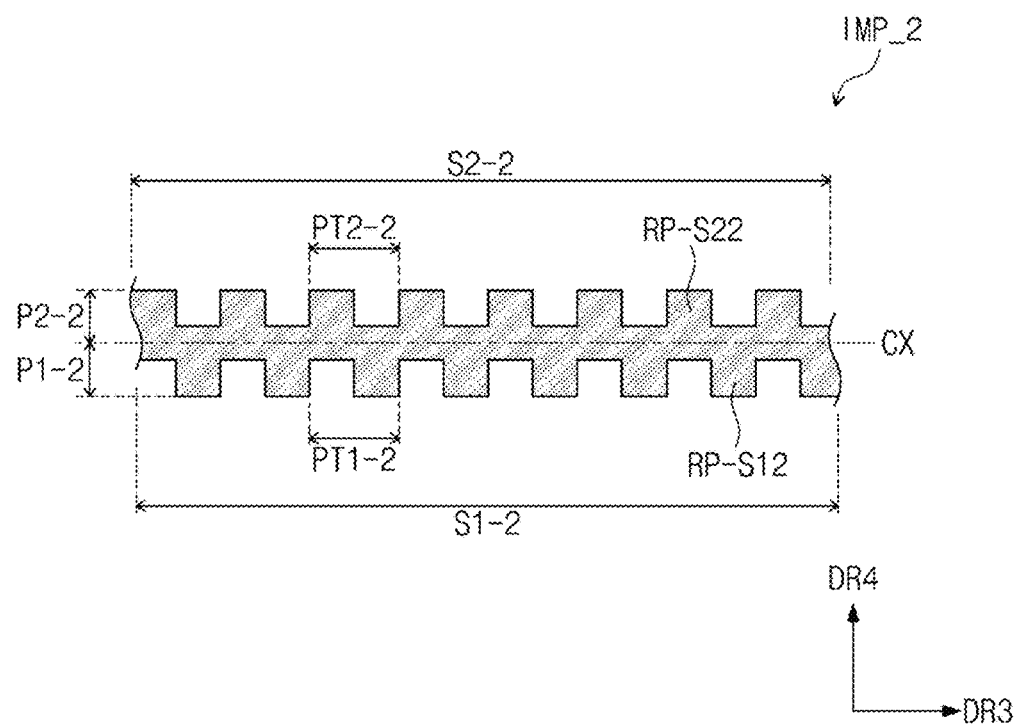
Figure 4C:
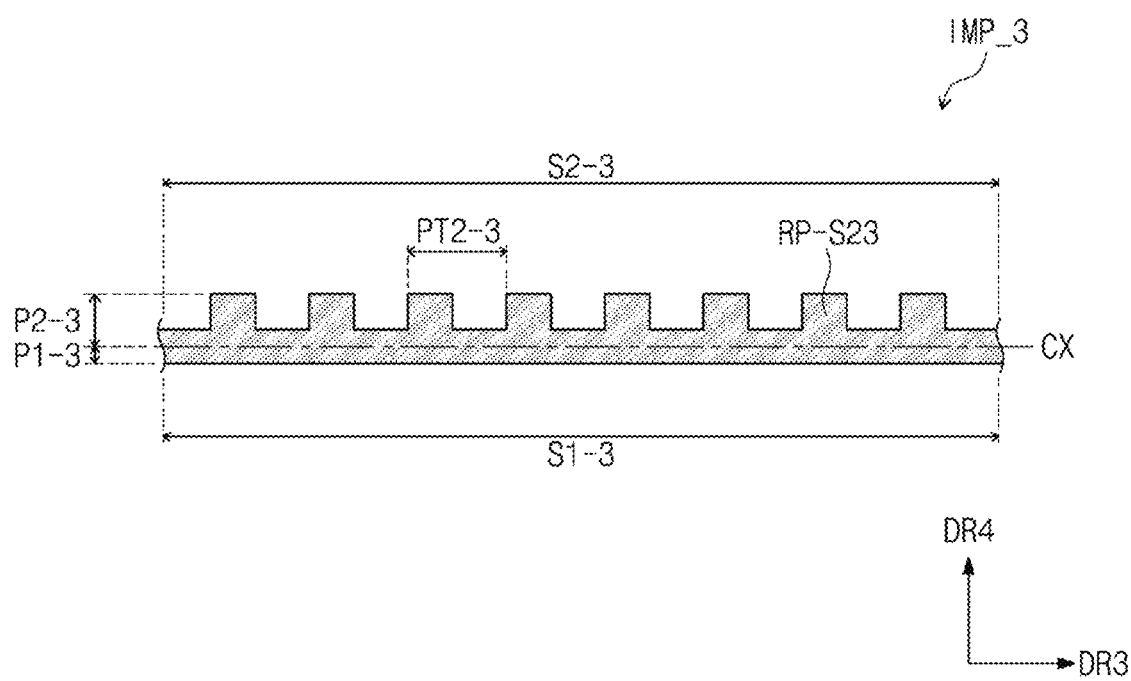

FIGS. 4A to 4C are plan views each illustrating some auxiliary electrodes according to various exemplary embodiments. Hereinafter, various shapes of auxiliary electrodes IMP_1, IMP_2, and IMP_3 will be described with respect to FIGS. 4A to 4C.

As shown in FIG. 4A, the auxiliary electrode IMP_1 may include a first portion P1-1 and a second portion P2-1 that are asymmetric with respect to the center axis CX. The first portion P1-1 may include a first side S1-1 including a plurality of first protruding patterns RP-S11, and the second portion P2-1 may include a second side S2-1 including a plurality of second protruding patterns RP-S21.

The first protruding patterns RP-S11 and the second protruding patterns RP-S21 may be provided to have the same pitch. In other words, a first pitch PT1-1 of the first protruding patterns RP-S11 may be substantially equal to a second pitch PT2-1 of the second protruding patterns RP-S21. However, the first protruding patterns RP-S11 and the second protruding patterns RP-S21 may be different from each other in terms of their protruding lengths. For instance, the first protruding patterns RP-S11 may have protruding lengths shorter than the second protruding patterns RP-S21. The first portion P1-1 and the second portion P2-1 may have different areas (e.g., surface areas) from each other.

According to some exemplary embodiments, since the auxiliary electrode IMP_1 includes the first portion P1-1 and the second portion P2-1 that are designed to have the same pitch but different areas, it may be possible to realize the auxiliary electrode IMP_1 having an asymmetric shape with respect to the center axis CX.

As shown in FIG. 4B, the auxiliary electrode IMP_2 may include a first portion P1-2 and a second portion P2-2 that are asymmetric with respect to the center axis CX. The first portion P1-2 may include a first side S1-2 including a plurality of first protruding patterns RP-S12, and the second portion P2-2 may include a second side S2-2 including a plurality of second protruding patterns RP-S22.

The first protruding patterns RP-S12 and the second protruding patterns RP-S22 may have substantially the same pitch. In other words, a first pitch PT1-2 of the first protruding patterns RP-S12 may be substantially equal to a second pitch PT2-2 of the second protruding patterns RP-S22. Also, the first protruding patterns RP-S12 and the second protruding patterns RP-S22 may have the same protruding length. The first portion P1-2 and the second portion P2-2 may have substantially the same area. However, the first protruding patterns RP-S12 and the second protruding patterns RP-S22 may be arranged to be misaligned with each other (e.g., not to have linear symmetry to each other with respect to the center axis CX) or offset from one another. In some exemplary embodiments, the first protruding patterns RP-S12 and the second protruding patterns RP-S22 may be provided in such a way that they are not overlapped with each other in the fourth direction DR4. For instance, when the auxiliary electrode IMP_2 is folded in half with respect to the center axis CX, the first protruding patterns RP-S12 and the second protruding patterns RP-S22 may not overlap one another. In some exemplary embodiments, however, the first protruding patterns RP-S12 and the second protruding patterns RP-S22 may partially overlap with one another.

Thus, according to some exemplary embodiments, the auxiliary electrode IMP_2 may include the first portion P1-2 and the second portion P2-2, which are provided to have the same pitch and the same area, and in which protruding patterns are designed to include parts that are asymmetric to each other. As such, it may be possible to realize the auxiliary electrode IMP_2 having an asymmetric shape with respect to the center axis CX.

As shown in FIG. 4C, the auxiliary electrode IMP_3 may include a first portion P1-3 and a second portion P2-3 that are asymmetric with respect to the center axis CX. The second portion P2-3 may include a second side S2-3 including a plurality of second protruding patterns RP-S23. The second protruding patterns RP-S23 may be sequentially arranged with a pitch PT2-3 in the third direction DR3. The first portion P1-3, however, may not have a protruding pattern. The first portion P1-3 may include a first side S1-3 extending in the third direction DR3 and having a straight line shape. Accordingly, the first portion P1-3 and the second portion P2-3 may be asymmetric to each other with respect to the center axis CX.

In some exemplary embodiments, by variously controlling the shapes of the first and second portions P1-3 and P2-3, the auxiliary electrodes may be designed to have asymmetric sides with respect to the center axis CX. According to some exemplary embodiments, the electronic device may include auxiliary electrodes having various shapes, but the inventive concepts are not limited to any one of such embodiments.

Figure 5A:
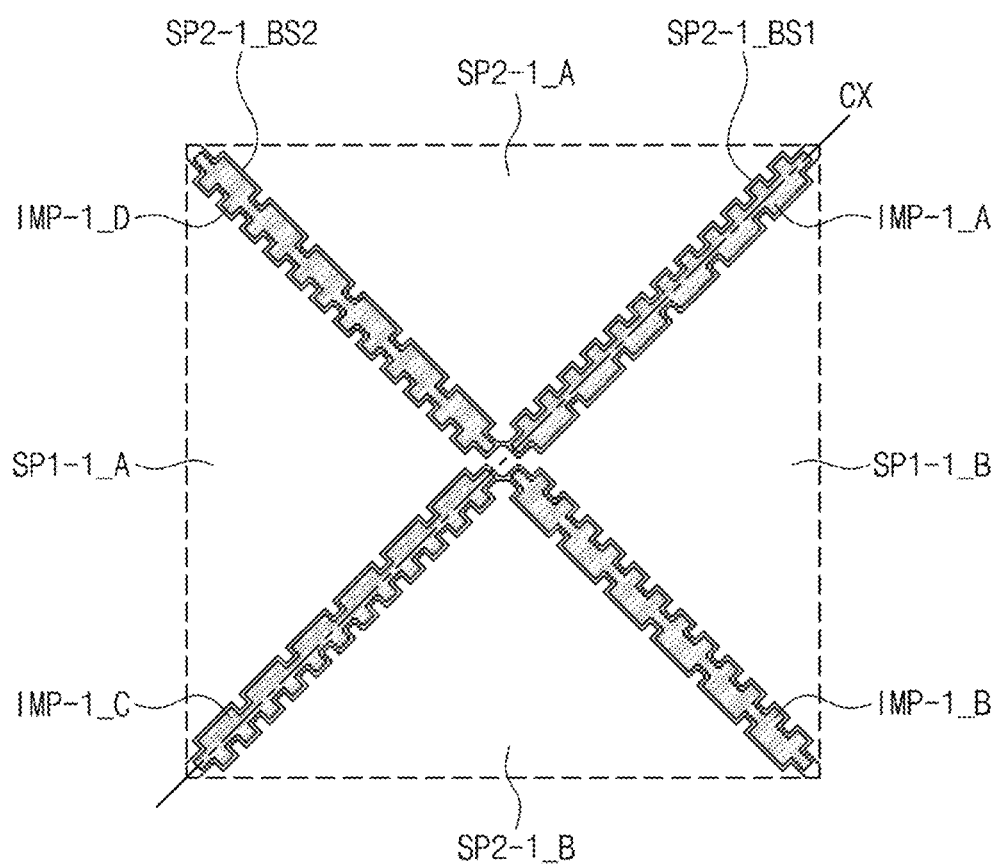
FIG. 5A is an enlarged plan view illustrating a region of an electronic device according to some exemplary embodiments.
Figure 5A:
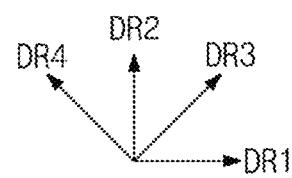
Figure 5B:
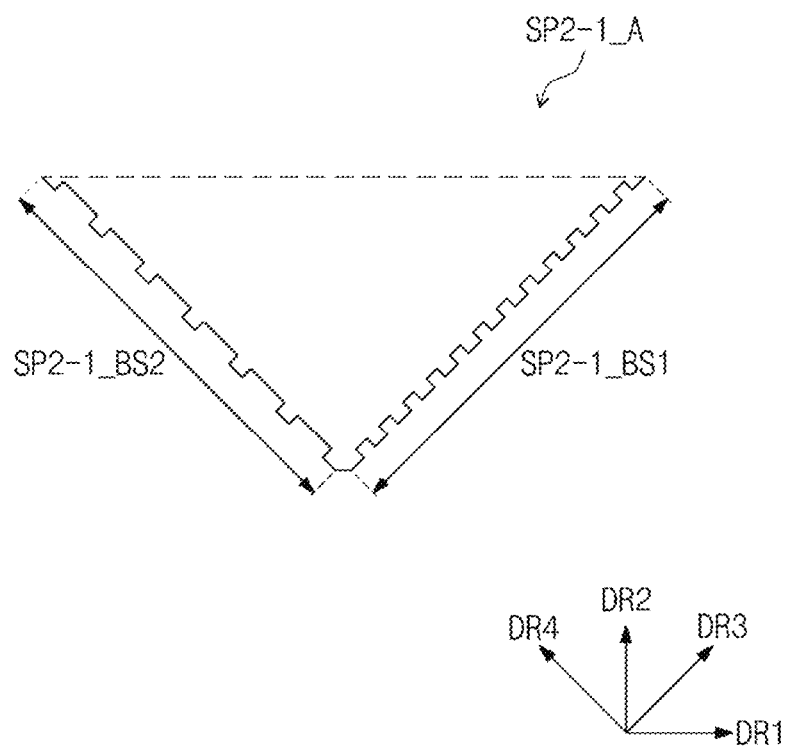
FIG. 5B is a plan view illustrating a portion of the structure shown in FIG. 5A according to some exemplary embodiments.

FIG. 5A is an enlarged plan view illustrating a region of an electronic device according to some exemplary embodiments, and FIG. 5B is a plan view illustrating a portion of the structure shown in FIG. 5A according to some exemplary embodiments. For convenience in illustration, FIG. 5A illustrates a region corresponding to that of FIG. 3A.

In FIG. 5A, left and right first sensor electrodes SP1-1_A and SP1-1_B, which are connected to each other, and upper and lower second sensor electrodes SP2-1_A and SP2-1_B, which cross the two first sensor electrodes SP1-1_A and SP1-1_B in an electrically disconnected manner, are exemplarily illustrated.

The auxiliary electrodes IMP-1_A, IMP-1_B, IMP-1_C, and IMP-1_D may be placed between respective pairs of four sensor electrodes SP1-1_A, SP1-1_B, SP2-1_A, and SP2-1_B. The auxiliary electrodes IMP-1_A, IMP-1_B, IMP-1_C, and IMP-1_D may include first to fourth auxiliary electrodes IMP-1_A, IMP-1_B, IMP-1_C, and IMP-1_D that are arranged in a clockwise direction.

According to some exemplary embodiments, the first to fourth auxiliary electrodes IMP-1_A, IMP-1_B, IMP-1_C, and IMP-1_D may be provided to be rotatable. For instance, the second auxiliary electrode IMP-1_B may be provided to be rotationally symmetric with respect to the first auxiliary electrode IMP-1_A by 90°, the third auxiliary electrode IMP-1_C may be provided to be rotationally symmetric with respect to the first auxiliary electrode IMP-1_A by 180°, and the fourth auxiliary electrode IMP-1_D may be provided to be rotationally symmetric with respect to the first auxiliary electrode IMP-1_A by 270°. In this manner, sides of the first to fourth auxiliary electrodes IMP-1_A, IMP-1_B, IMP-1_C, and IMP-1_D facing respective ones of the four sensor electrodes SP1-1_A, SP1-1_B, SP2-1_A, and SP2-1_B at their respective boundary sides may not be the same.

For example, in the case of the upper second sensor electrode SP2-1_A, a side of the first auxiliary electrode IMP-1_A adjacent to a first boundary side SP2-1_BS1 of the upper second sensor electrode SP2-1_A and a side of the fourth auxiliary electrode IMP-1_D adjacent to a second boundary side SP2-1_BS2 of the upper second sensor electrode SP2-1_A may be different sides that are configured differently than one another.

According to some exemplary embodiments, the auxiliary electrodes may be arranged in various shapes. In addition, although not shown, the first to fourth auxiliary electrodes IMP-1_A, IMP-1_B, IMP-1_C, and IMP-1_D may have different shapes from each other. According to an exemplary embodiment, the electronic device may include the auxiliary electrodes having various shapes and various arrangements, but the inventive concepts are not limited thereto.

Meanwhile, referring to FIG. 5B, the sensor electrode (e.g., upper second sensor electrode SP2-1_A), according to some exemplary embodiments, may include boundary sides having different shapes. As an example, for the upper second sensor electrode SP2-1_A, the first boundary side SP2-1_BS1 and the second boundary side SP2-1_BS2 may have different shapes from each other.

In the case where each of the boundary sides SP2-1_BS1 and SP2-1_BS2 of the upper second sensor electrode SP2-1_A have a shape engaged with an adjacent one of the auxiliary electrodes IMP-1_A and IMP-1_D, the boundary sides SP2-1_BS1 and SP2-1_BS2 of the upper second sensor electrode SP2-1A may have different shapes, owing to the auxiliary electrodes IMP-1_A and IMP-1_D.

Thus, according to some exemplary embodiments, the sensor electrodes may be designed to have various boundary sides. The shorter the distances between the boundary sides of the sensor electrodes and the auxiliary electrodes, the larger the areas of the sensor electrodes, and, in this case, the touch sensitivity of the electronic device can be improved.

In some exemplary embodiments, the touch sensitivity may be affected by a sum of lengths of each of the boundary sides and a distance between boundary sides of the sensor electrodes facing each other. In the electronic device according to some exemplary embodiments, at least one side of each of the auxiliary electrodes may be provided to form a plurality of patterns, and the boundary sides of the sensor electrodes may be designed to have a shape in contact with the patterns. Accordingly, it may be possible to improve the touch sensitivity of the electronic device.

According to some exemplary embodiments, by variously designing the shapes of the sensor electrode and the auxiliary electrode, it may be possible to improve touch sensitivity of the electronic device and to prevent (or at least reduce) visibility of the electronic device from being deteriorated. According to some exemplary embodiments, it may be possible to provide a pleasant touch environment to a user.

Figure 6A:
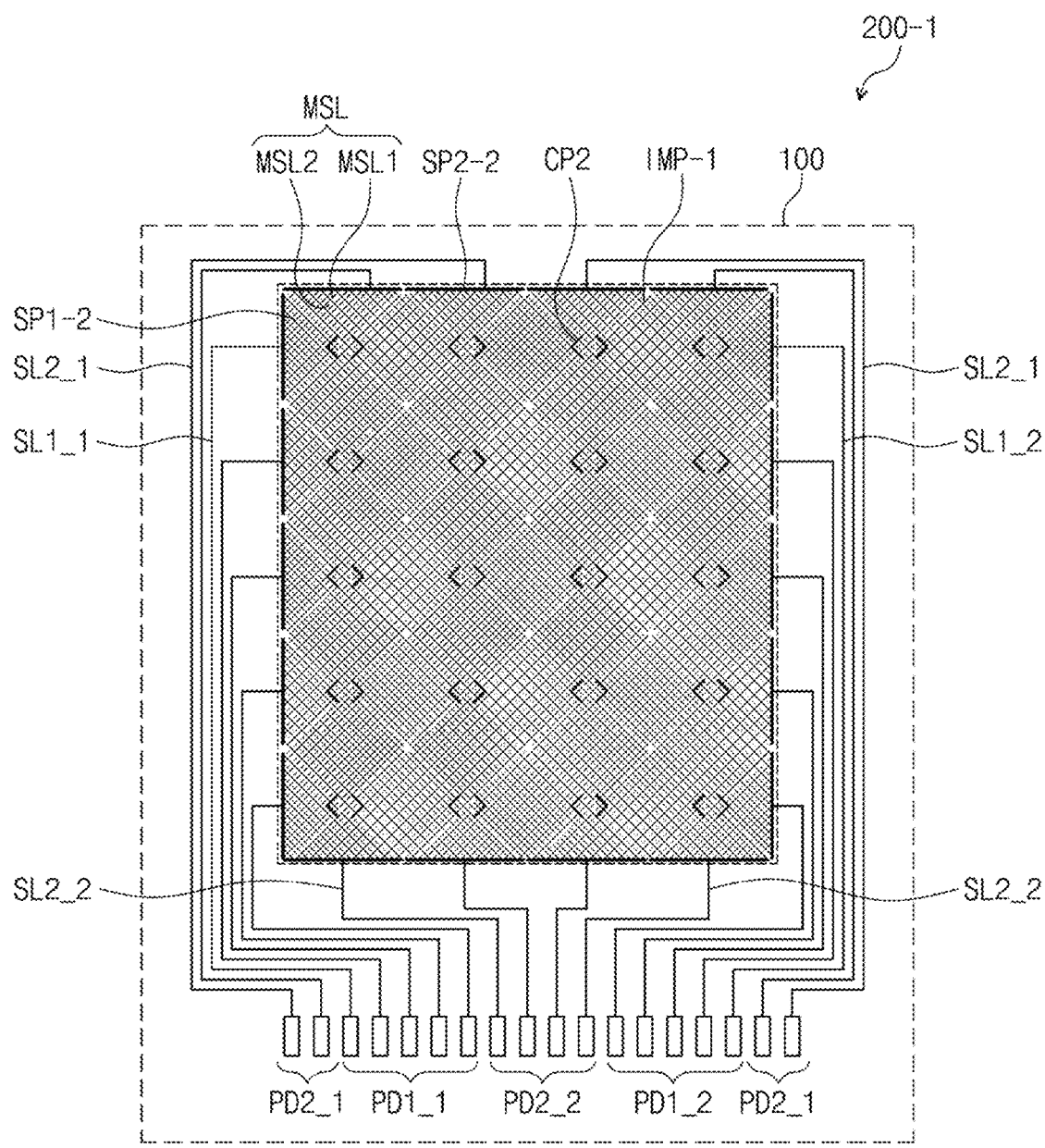
FIGS. 6A and 6B are plan views illustrating touch structures according to some exemplary embodiments.
Figure 6B:
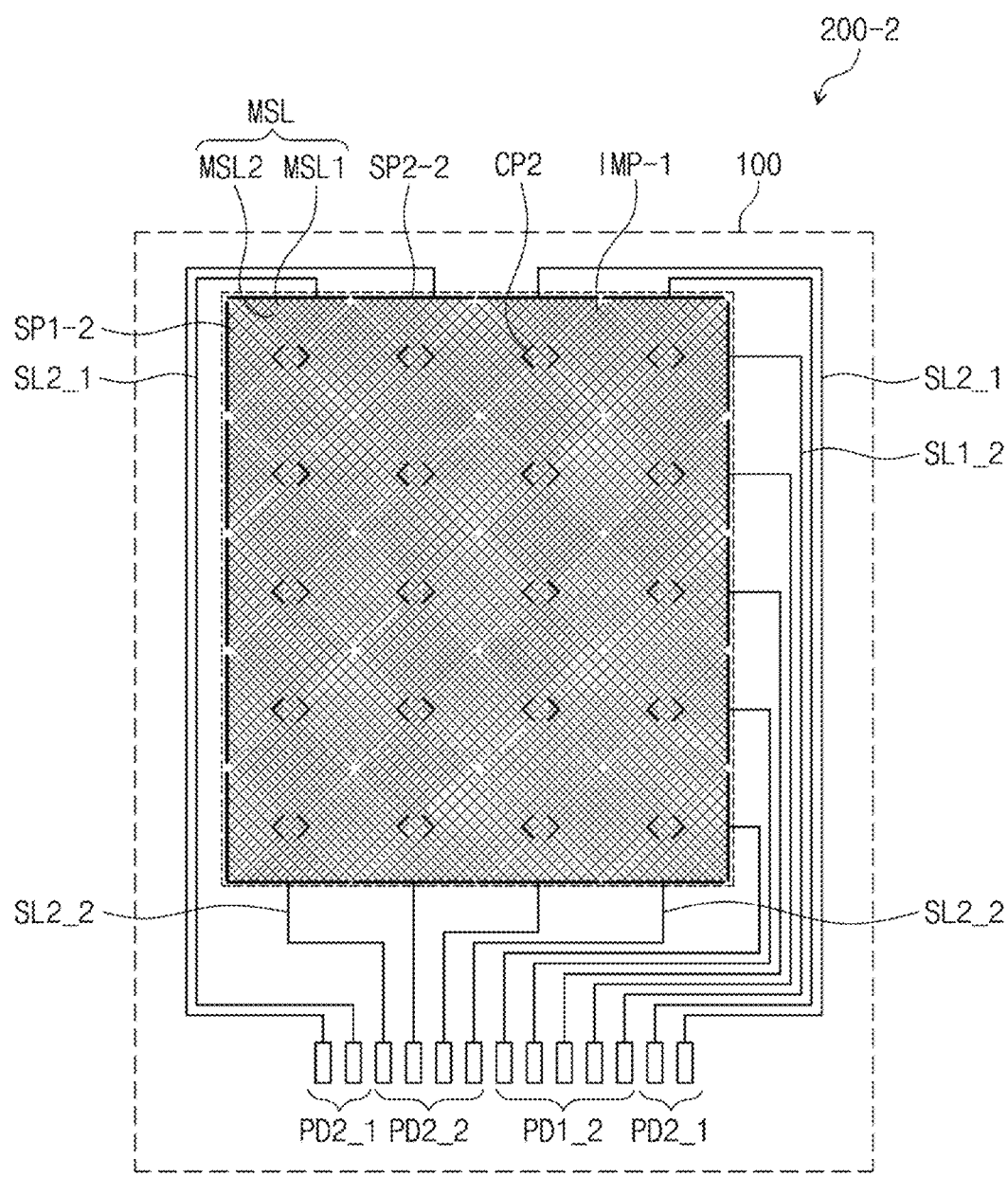

FIGS. 6A and 6B are plan views illustrating touch structures according to some exemplary embodiments. For convenience in illustration, in FIGS. 6A and 6B, a dotted line depicts the base structure 100 on which each of touch structures 200-1 and 200-2 is disposed. Hereinafter, an electronic device according to some exemplary embodiments will be described with respect to FIGS. 6A and 6B. For concise description, an element previously described with reference to FIGS. 1 to 5B may be identified by a similar or identical reference number without repeating an overlapping description thereof.

As shown in FIGS. 6A and 6B, each of first sensor electrodes SP1-2 and second sensor electrodes SP2-2 may include a plurality of mesh lines MSL. The mesh lines MSL may include a plurality of first mesh lines MSL1 and a plurality of second mesh lines MSL2.

The first mesh lines MSL1 may extend in the third direction DR3 and may be arranged to be spaced apart from each other in the fourth direction DR4. The second mesh lines MSL2 may extend in the fourth direction DR4 and may be arranged to be spaced apart from each other in the third direction DR3. The first mesh lines MSL1 and the second mesh lines MSL2 may be provided on the same layer to cross each other, thereby being connected to each other.

As shown in FIG. 6A, the first sensor electrodes SP1-2 may be connected to each other in the first direction DR1. The first sensor electrodes SP1-2 in each row may be electrically connected to each other through a first connecting portion (not shown). As described above, each row may correspond to the first sensor S1 (e.g., see FIG. 2).

The second sensor electrodes SP2-2 may be connected to each other in the second direction DR2. The second sensor electrodes SP2-2 in each column may be electrically connected to each other through the second connecting portion CP2. As described above, each column may correspond to the second sensor S2 (e.g., see FIG. 2).

According to some exemplary embodiments, the first sensors in respective rows and the second sensors in respective columns may be connected to a plurality of signal lines. For instance, ones of the first sensors at a side may be connected to a first group of the first pads PD1_1 through the first interconnection lines SL1_1, and ones of the first sensors at an opposite side may be connected to a first group of the second pads PD1_2 through the fourth interconnection lines SL2_2.

Ones of the second sensors at a side may be connected to a second group of first pads PD2_1 through third interconnection lines SL2_1, and ones of the second sensors at an opposite side may be connected to a second group of second pads PD2_2 through second interconnection lines SL1_2. In the touch structure 200-1 according to some exemplary embodiments, a plurality of interconnection lines may be connected to a single sensor, and this may make it possible to reduce deterioration in sensitivity, which may be caused by position-dependent voltage drop of an electrical signal.

According to some exemplary embodiments, the electronic device may be operated in two different modes (e.g., a self-capacitance mode and a mutual-capacitance mode). Here, the first or second pads included in a specific group may be connected to a driving circuit that is different from that for the first or second pads included in another group. For example, the first group of the first pads PD1_1 and the first group of the second pads PD2_1 connected to the first interconnection lines SL1_1 and the third interconnection lines SL2_1 may be connected to a self-capacitance driving part, and the second group of the first pads PD1_2 and the second group of the second pads PD2_2 connected to the second interconnection lines SL1_2 and the fourth interconnection lines SL2_2 may be connected to a mutual-capacitance driving part. Accordingly, the touch structure 200-1 can be stably operated in both of two different driving modes.

According to some exemplary embodiments, the plurality of signal lines may be connected to a single driving part or different driving parts, and thus, the electronic device may be operated in various driving or operating modes. Accordingly, it may be possible to increase a degree of freedom in operating the electronic device, and even when there is no additional electronic device (e.g., a switching device), it may be possible to change the operation mode in various manners. As a result, the electronic device may have enlarged availability.

Alternatively, as shown in FIG. 6B, the touch structure 200-2 may include a sensor connected to a single signal line and another sensor connected to a plurality of signal lines. For example, in the touch structure 200-2, the first interconnection lines SL1_1 may be omitted, unlike the touch structure 200-1 of FIG. 6A. Similarly, in the touch structure 200-2, one group of the first and second groups of the first pads PD1_1 and PD2_1 may be omitted. As seen in FIG. 6B, the touch structure 200-2, in which the first group of the first pads PD1_1 is omitted, is exemplarily illustrated.

Accordingly, the second sensors, which are arranged in the first direction DR1 to form the columns, may be connected to the third interconnection lines SL2_1 and the second interconnection lines SL1_2, but the first sensors, which are arranged in the second direction DR2 and consist of the first sensor electrodes SP1-2, may be connected to only the fourth interconnection lines SL2_2. Thus, the second sensors may be connected to the plurality of signal lines at upper and lower sides, but the first sensors may be connected to the plurality of signal lines at a side, but not at an opposite side.

Accordingly, for the second sensors with a relatively large area, a region connected with the signal lines may be enlarged to prevent region-dependent deterioration in touch sensitivity, and thus, it may be possible to realize a uniform touch environment. In addition, for the first sensors with a relatively small area, since the number of the signal lines used for the connection is relatively small, compared with the second sensors, it may be possible to prevent an area of the peripheral region NAA (e.g., see FIG. 1) from being increased by the signal lines.

In some exemplary embodiments, a connection structure between the first sensors and the signal lines may be different from that between the second sensors and the signal lines. Since the sensors are connected to the signal lines in various connection manners, the electronic device may be operated in various manners and may be designed to have various touch structures. However, the inventive concepts are not limited to the above-described examples, and for example, driving signals may be provided to the touch structure in various manners.

Figure 7A:
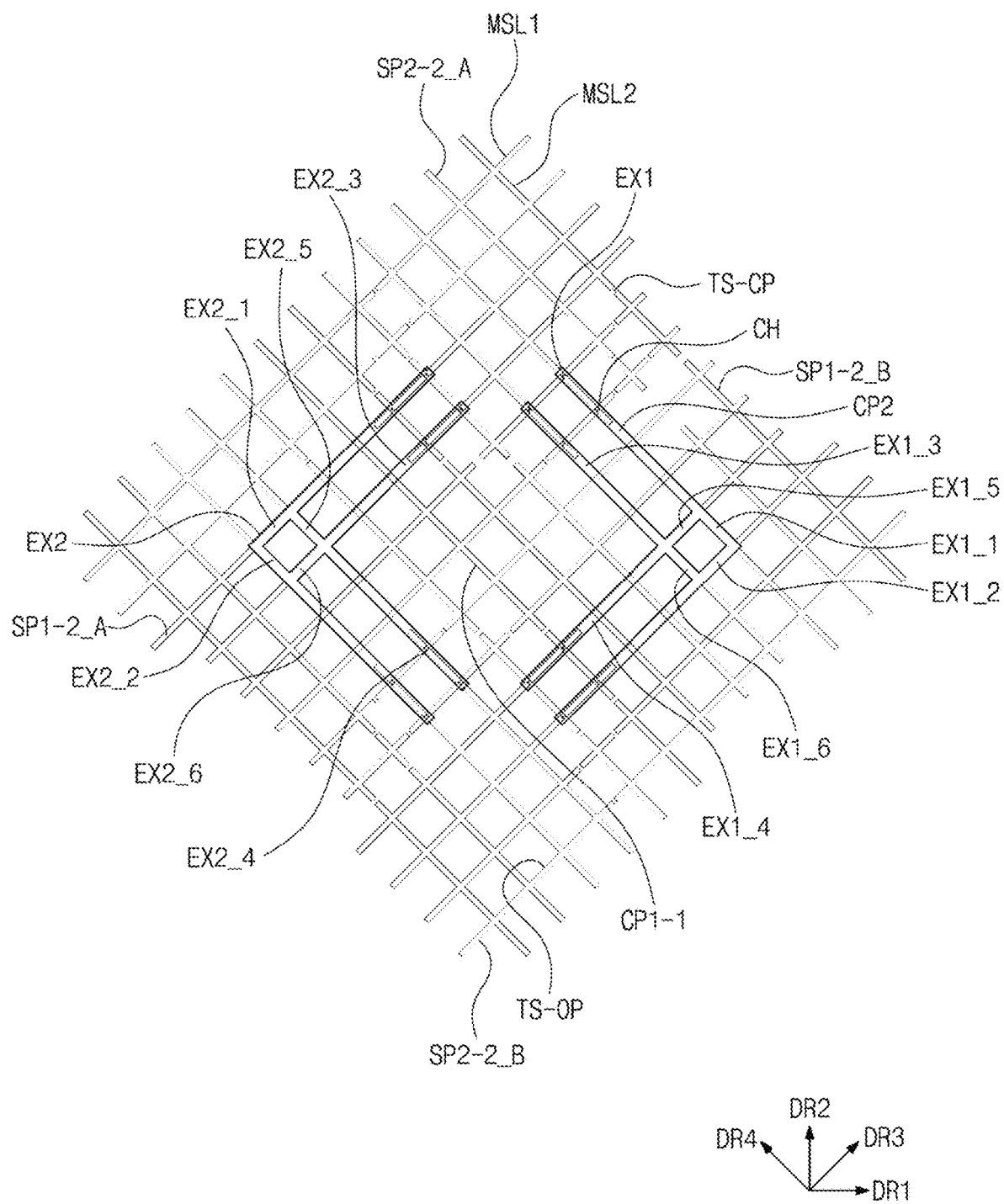
FIG. 7A is an enlarged plan view illustrating a region of the structure shown in FIG. 6A according to some exemplary embodiments.
Figure 7B:
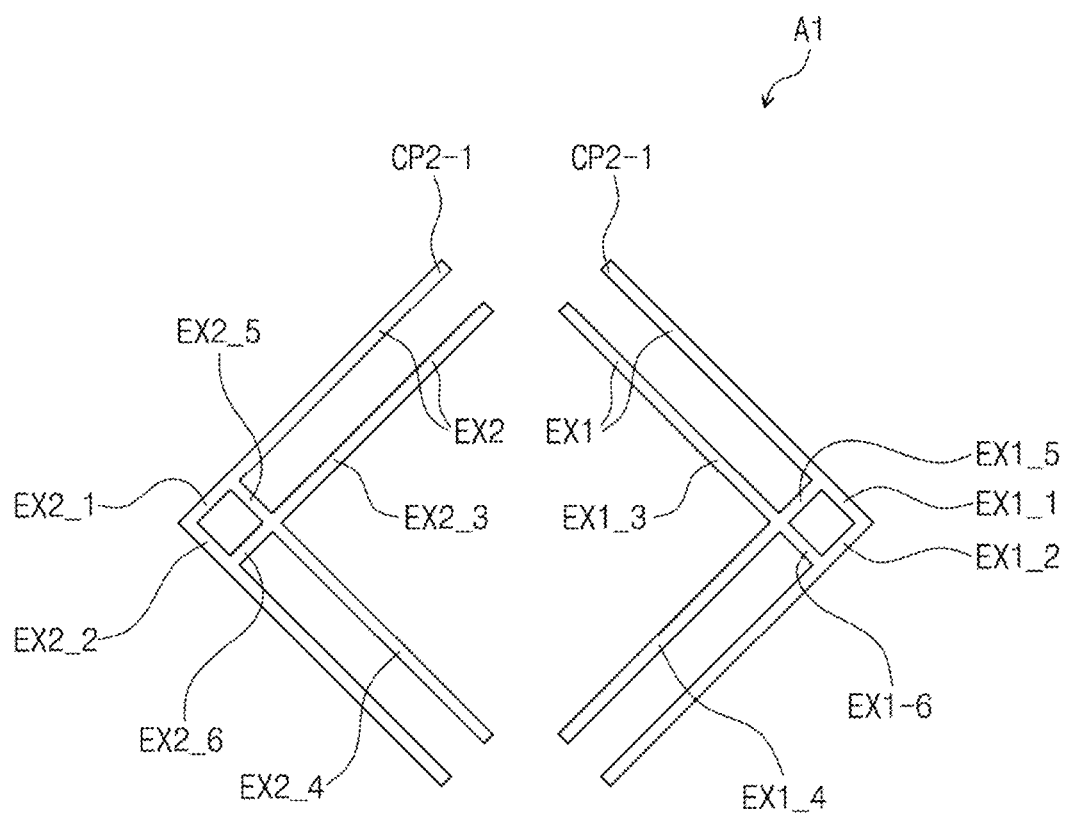
FIGS. 7B and 7C are plan views illustrating portions of the structure shown in FIG. 7A according to some exemplary embodiments.
Figure 7C:
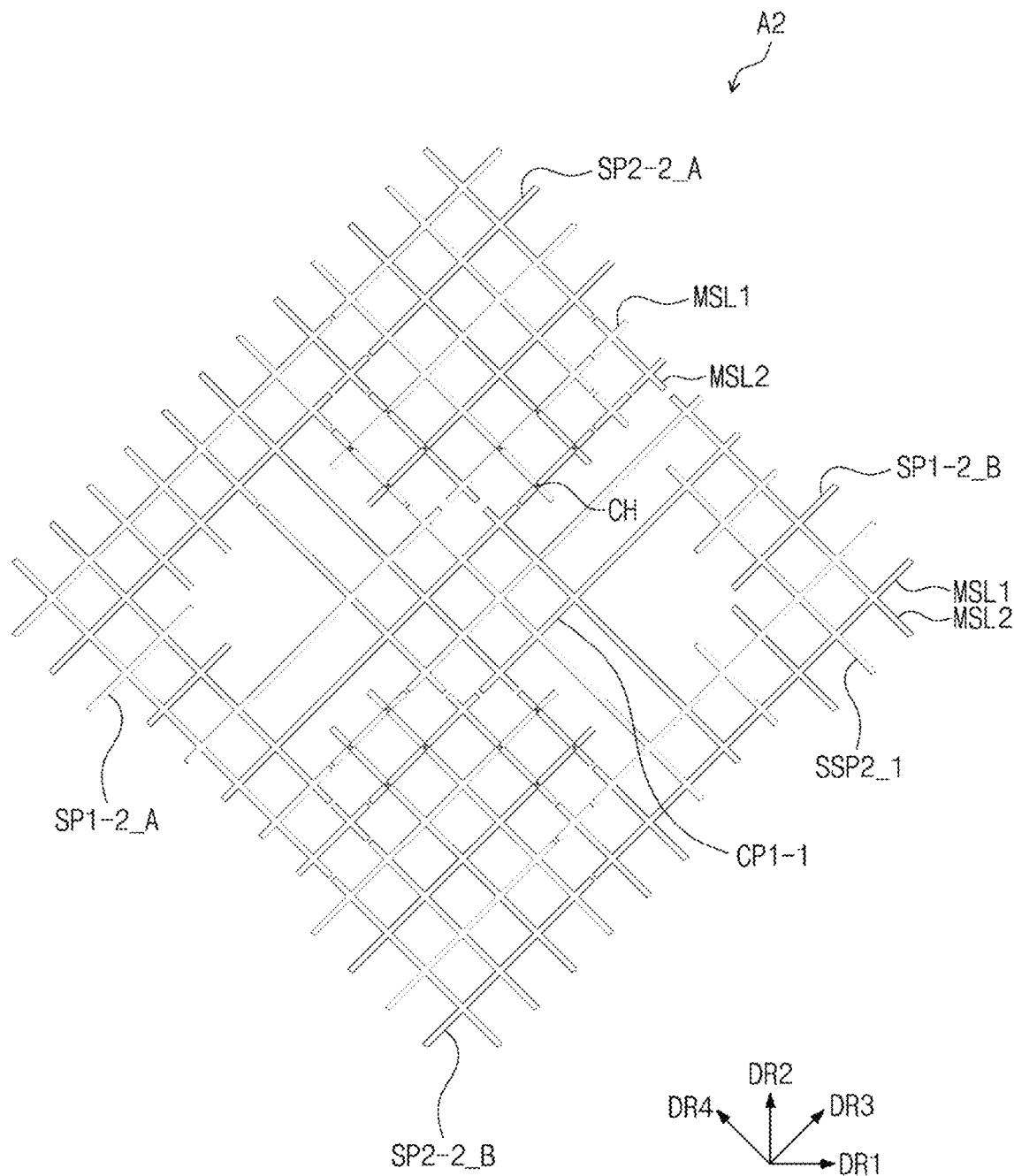
Figure 7D:
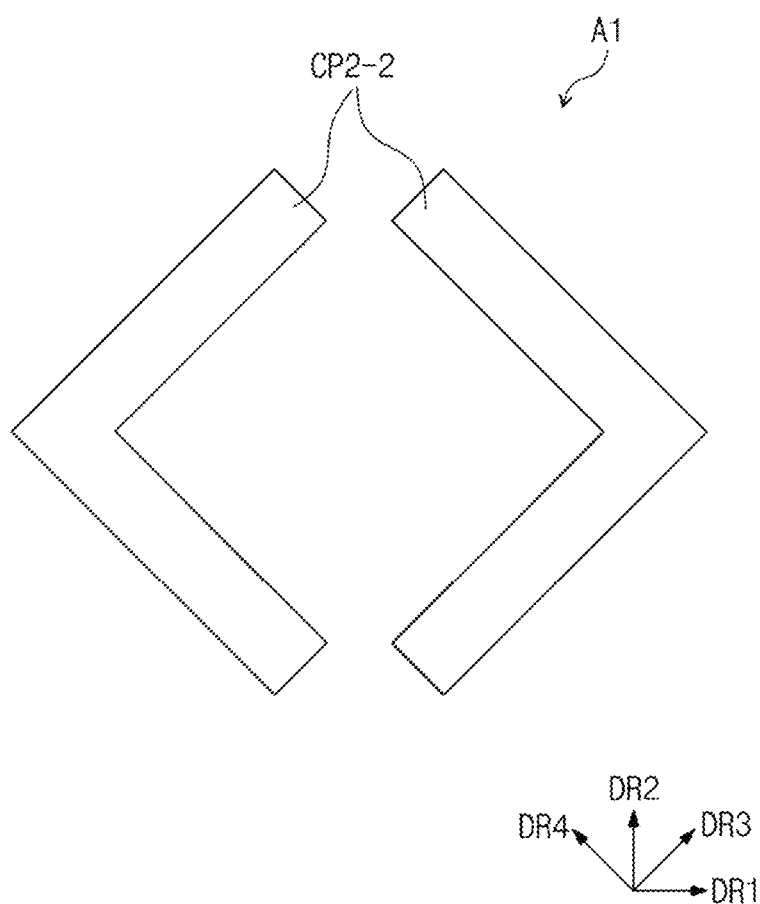
FIG. 7D is a plan view illustrating a portion of an electronic device according to some exemplary embodiments.

FIG. 7A is an enlarged plan view illustrating a region of the structure shown in FIG. 6A according to some exemplary embodiments. FIGS. 7B and 7C are plan views illustrating portions of the structure shown in FIG. 7A according to some exemplary embodiments. FIG. 7D is a plan view illustrating a portion of an electronic device according to some exemplary embodiments. For convenience in illustration and description, components provided on different layers are illustrated in FIGS. 7B and 7C, respectively.

In detail, FIG. 7B illustrates components, some of which are shown in FIG. 7A and are included in a first layer A1, and FIG. 7C illustrates components, others of which are shown in FIG. 7A and are included in a second layer A2 on the first layer A1. Hereinafter, one or more exemplary embodiments will be described with respect to FIGS. 7A to 7D. For concise description, an element previously described with reference to FIGS. 1 to 6 may be identified by a similar or identical reference number without repeating an overlapping description thereof.

FIG. 7A is an enlarged view of a region, at which the first sensor electrodes SP1-2 and the second sensor electrodes SP2-2 cross each other, of the structure shown in FIG. 6A. A left first sensor electrode SP1-2_A and a right first sensor electrode SP1-2_B are exemplarily shown as portions of the first sensor electrodes SP1-2, and an upper second sensor electrode SP2-2_A and a lower second sensor electrode SP2-2_B are exemplarily shown as portions of the second sensor electrodes SP2-2.

As described above, each of the first sensor electrodes SP1-2 and the second sensor electrodes SP2-2 may include the first mesh lines MSL1 extending in a third direction DR3 and the second mesh lines MSL2 extending in a fourth direction DR4. For convenience in illustration, openings TS-OP defined by the first mesh lines MSL1 and the second mesh lines MSL2 are illustrated to have the same size.

Referring to FIGS. 7A to 7C, a second connecting portion CP2-1 may be located at a level different from that of the second sensor electrodes SP2-1. In some exemplary embodiments, the second connecting portion CP2-1 may constitute the first layer A1.

The second connecting portion CP2-1 may include a first extension EX1 and a second extension EX2, which are spaced apart from each other in the first direction DR1 when viewed in a plan view. The first extension EX1 and the second extension EX2 may be symmetric to each other with respect to an axis extending in the second direction DR2. The first extension EX1 and the second extension EX2 may be spaced apart from each other with a first connecting portion CP1-1, which is provided in the second layer A2, interposed therebetween, and thus, the first extension EX1 and the second extension EX2 may not be overlapped with the first connecting portion CP1-1.

The first extension EX1 may be overlapped with the right first sensor electrode SP1-2_B, which is one of adjacent ones of the first sensor electrodes SP1-2, to connect the upper second sensor electrode SP2-2_A and the lower second sensor electrode SP2-2_B to each other via, for instance, one or more connection holes (or points) CH. The second extension EX2 may be overlapped with the left first sensor electrode SP1-2_A, which is another of the adjacent ones of the first sensor electrodes SP1-2, to connect the upper second sensor electrode SP2-2_A and the lower second sensor electrode SP2-2_B to each other via, for instance, one or more connection holes (or points) CH.

The first extension EX1 may include first, second, third, fourth, fifth, and sixth sub-extensions EX1_1, EX12, EX13, EX14, EX1_5, and EX1_6. The first sub-extension EX1_1 and the third sub-extension EX1_3 may extend in the third direction DR3, and the second sub-extension EX1_2 and the fourth sub-extension EX1_4 may extend in the fourth direction DR4. The first sub-extension EX1_1 and the second sub-extension EX1_2 may be connected to each other, and the third sub-extension EX1_3 and the fourth sub-extension EX1_4 may be connected to each other and may be spaced apart from the first sub-extension EX1_1 and the second sub-extension EX1_2 in the first direction DR1.

Each of the fifth sub-extension EX1_5 and the sixth sub-extension EX1_6 may connect two separate portions. The fifth sub-extension EX1_5 may connect the first sub-extension EX1_4 to the third sub-extension EX1_3, and the sixth sub-extension EX1_6 may connect the second sub-extension EX1_2 to the fourth sub-extension EX1_1.

Accordingly, a plurality of sub-extensions may be connected to each other, thereby constituting the first extension EX1 provided in the form of a single object. Meanwhile, the fifth sub-extension EX1_5 may be connected to the first sub-extension EX1_1 and the third sub-extension EX1_3, and the sixth sub-extension EX1_6 may be connected to the second sub-extension EX1_2 and the fourth sub-extension EX1_4 to form an opening. The opening may correspond to the opening TS-OP formed by the mesh lines MSL.

Similarly, the second extension EX2 may include the first, second, third, fourth, fifth, and sixth sub-extensions EX2_1, EX2_2, EX2_3, EX2_4, EX2_5, and EX2_6, which are connected to each other. The connecting of the first, second, third, fourth, fifth, and sixth sub-extensions EX2_1, EX2_2, EX2_3, EX2_4, EX2_5, and EX2_6 may be achieved in substantially the same manner as that for the first, second, third, fourth, fifth, and sixth sub-extensions EX1_1, EX1_2, EX1_3, EX1_4, EX1_5, and EX1_6 of the first extension EX1, and thus, a detailed description thereof will be omitted.

According to some exemplary embodiments, the second connecting portion CP2-1 may be provided at a layer different from that for the first sensor electrodes SP1-2, the second sensor electrodes SP2-2, and the first connecting portion CP1-1. Referring to FIGS. 7A and 7C, the first sensor electrodes SP1-2, the second sensor electrodes SP2-2, and the first connecting portion CP1-1 may have respective mesh shapes and may constitute the second layer A2.

The first connecting portion CP1-1 may be defined as a result of an extension of a portion of the first and second mesh lines MSL1 and MSL2 constituting the left first sensor electrode SP1-2_A and the right first sensor electrode SP1-2_B. In some exemplary embodiments, the first connecting portion CP1-1 may have a mesh shape, in which seven touch openings TS-OP are defined, and may have a shape extending in the first direction DR1.

The upper second sensor electrode SP2-2_A and the lower second sensor electrode SP2-2_B may be spaced apart from each other with the first connecting portion CP1-1 interposed therebetween. The first and second mesh lines MSL1 and MSL2 may be cut between the upper second sensor electrode SP2-2_A and the first connecting portion CP1-1 and between the lower second sensor electrode SP2-2_B and the first connecting portion CP1-1, and thus, in the second layer A2, the upper second sensor electrode SP2-2_A, the lower second sensor electrode SP2-2_B, and the first connecting portion CP1-1 may be electrically disconnected from each other.

The first and second sensor electrodes SP1 and SP2 may include a plurality of cut portions TS-CP. In each of the left first sensor electrode SP1-2_A and the right first sensor electrode SP1-2_B, the plurality of cut portions TS-CP may be spaced apart from each other and may be included in the first mesh lines MSL1 or the second mesh lines MSL2, respectively. Similarly, the cut portions TS-CP may be provided in the upper second sensor electrode SP2-2_A and the lower second sensor electrode SP2-2_B, respectively.

In the left first sensor electrode SP1-2_A and the right first sensor electrode SP1-2_B, there may be a region from which the touch openings TS-OP are removed. In other words, the left first sensor electrode SP1-2_A and the right first sensor electrode SP1-2_B may include a region in which the first mesh lines MSL1 and the second mesh lines MSL2 are removed.

Such a shape of the first sensor electrodes SP1-2 may reduce an area of the overlapping region between the second connecting portion CP2-1 and the first sensor electrodes SP1-2. Accordingly, it may be possible to prevent a parasitic capacitance from being formed between the second connecting portion CP2-1 and the first sensor electrodes SP1-2 or to prevent a short circuit from being formed during a fabrication process. As a result, the electronic device can have improved reliability.

Referring to FIG. 7D, a second connecting portion CP2-2 may be provided in the form of a conductive pattern. In this case, when compared with the structure provided in the form of the mesh lines MSL, the second connecting portion CP2-2 may have larger surface area and may have an improved conduction property. Accordingly, it may be possible to more effectively construct an electric connection structure between the upper second sensor electrode SP2-2_A and the lower second sensor electrode SP2-2_B and to improve touch sensitivity.

Meanwhile, the second connecting portion CP2-2 may include a transparent conductive material. Accordingly, the second connecting portion CP2-2 may be hardly recognized by an outside user, and it may be possible to reduce deterioration in visibility. But the inventive concepts are not limited to this example, and the structure of the sensor electrode in the electronic device may be variously changed.

Figure 8A:
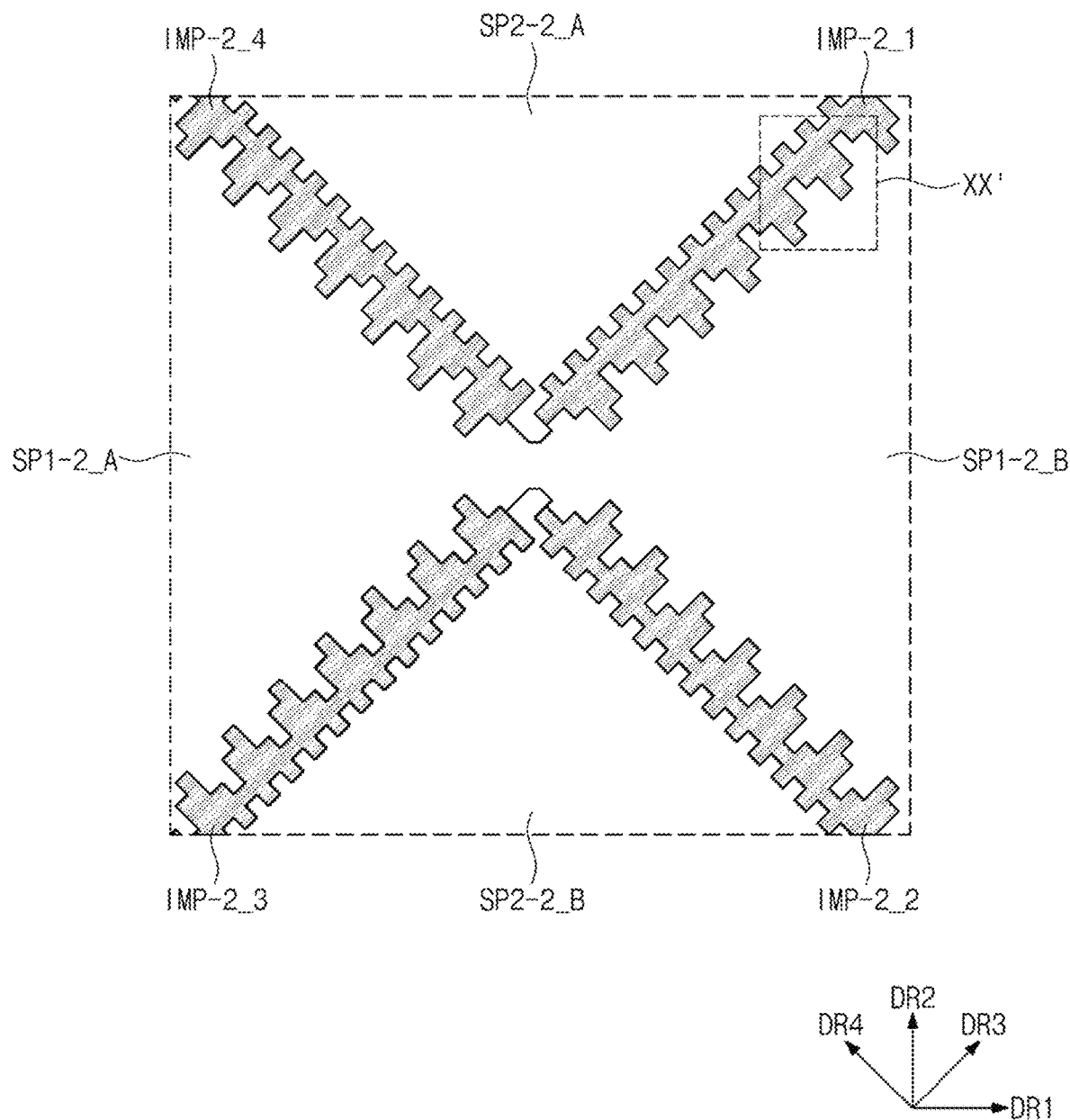
FIG. 8A is an enlarged plan view illustrating a region of the electronic device shown in FIG. 6A according to some exemplary embodiments.
Figure 8B:
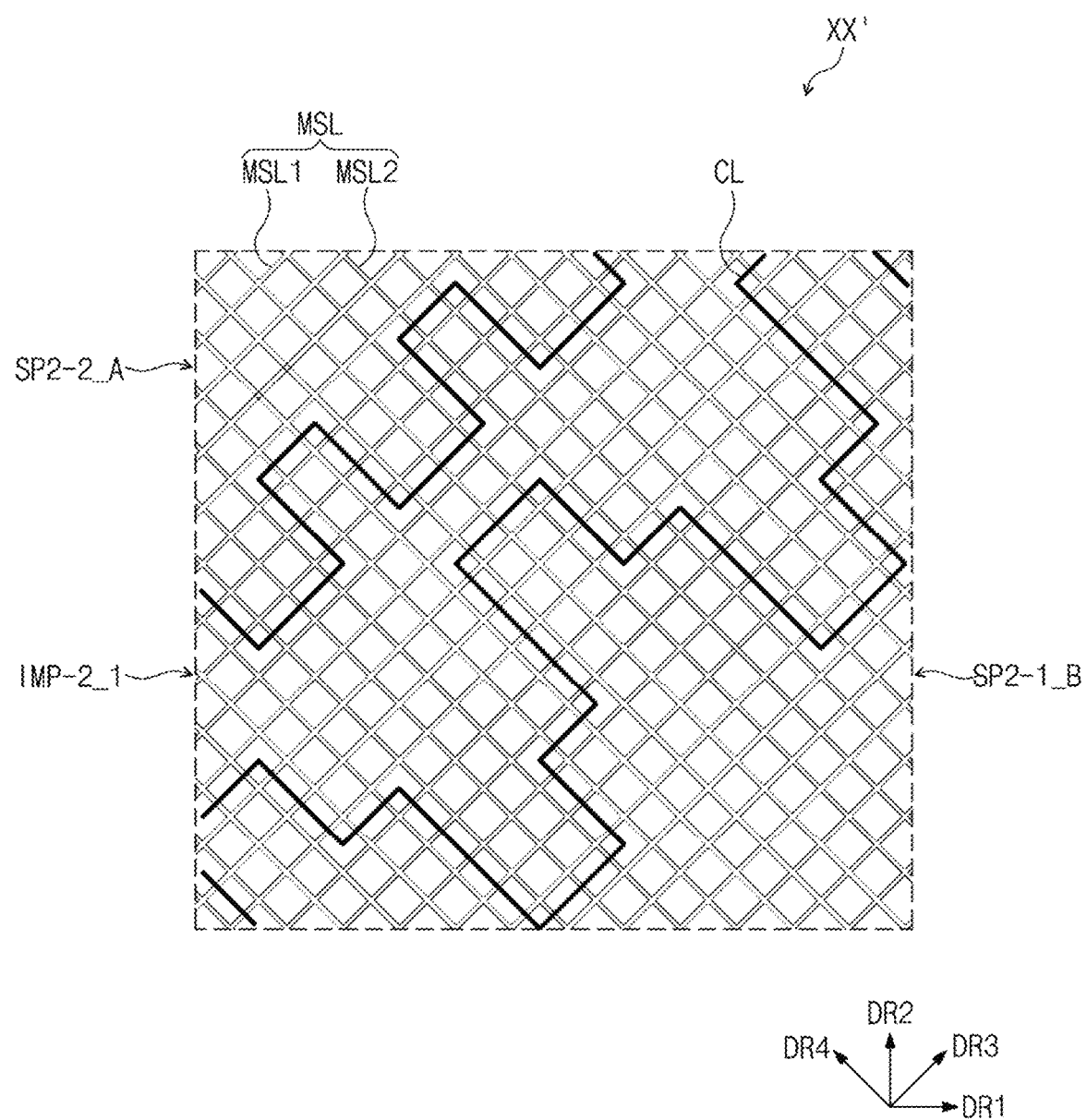
FIGS. 8B and 8C are enlarged plan views illustrating a region XX' shown in FIG. 8A according to some exemplary embodiments.
Figure 8C:
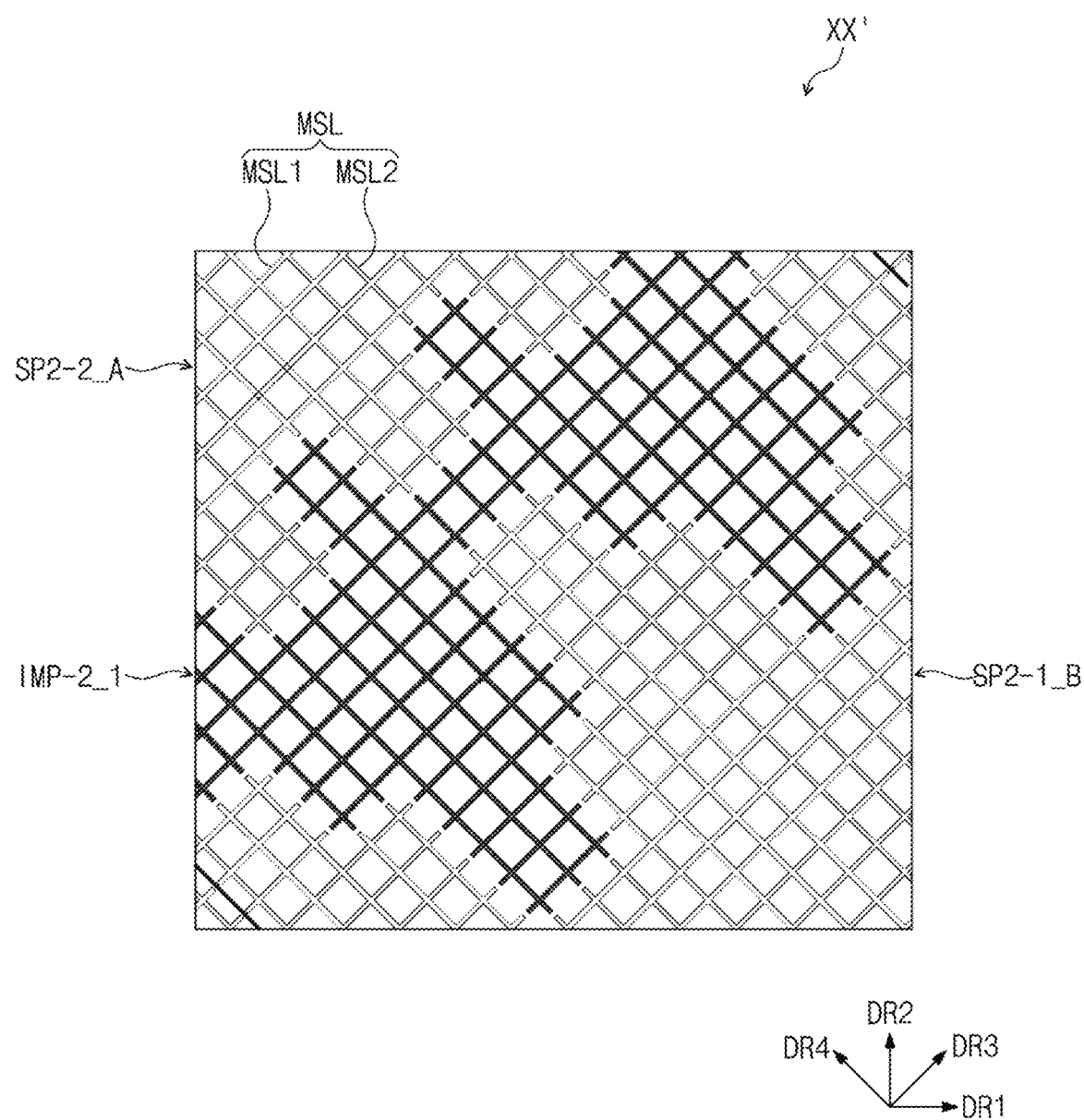
Figure 9:
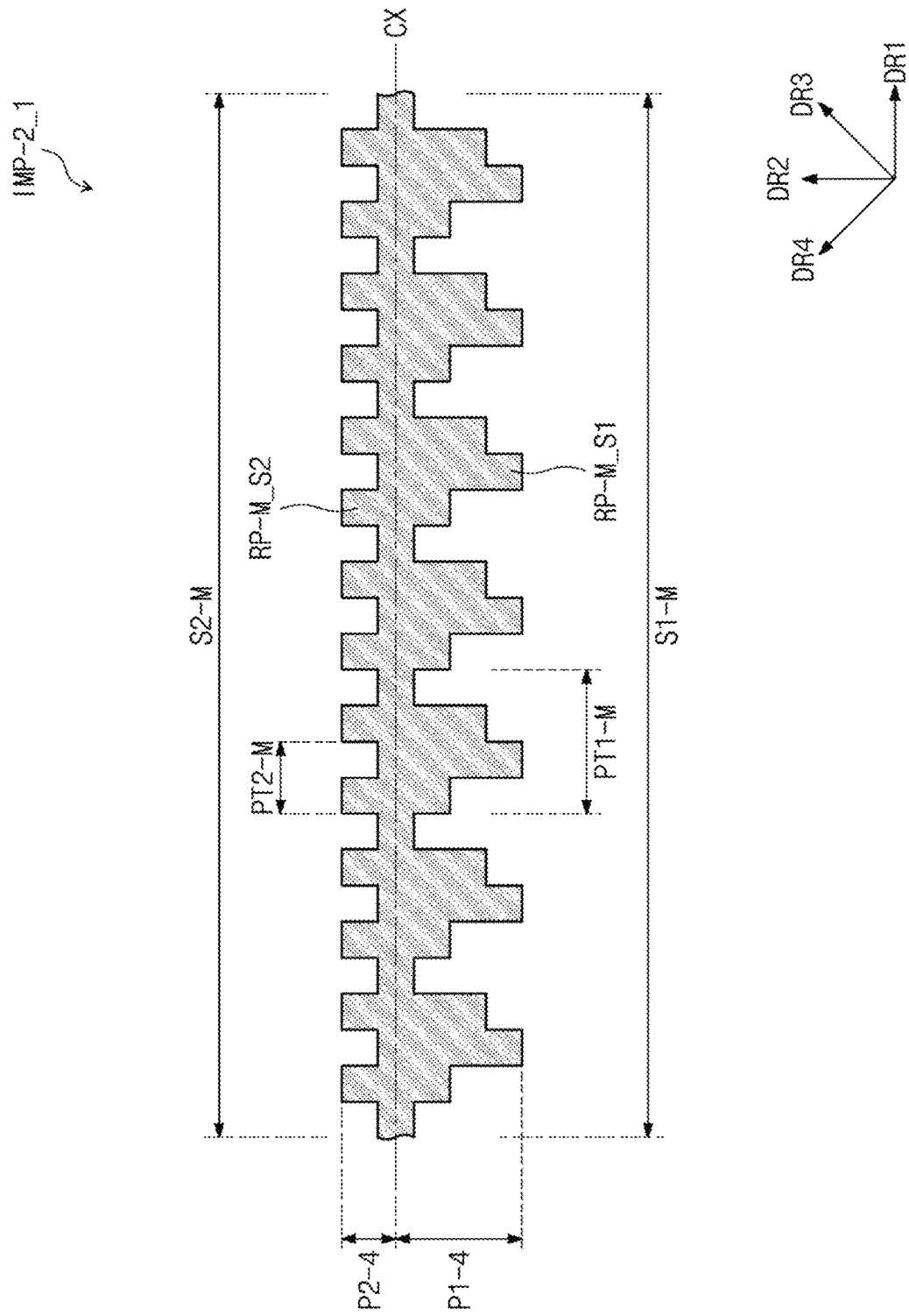
FIG. 9 is a plan view illustrating a portion of electrode patterns shown in FIG. 8B according to some exemplary embodiments.

FIG. 8A is an enlarged plan view illustrating a region of the electronic device shown in FIG. 6A according to some exemplary embodiments. FIGS. 8B and 8C are enlarged plan views illustrating a region XX' shown in FIG. 8A according to some exemplary embodiments. FIG. 9 is a plan view illustrating a portion of electrode patterns shown in FIG. 8B according to some exemplary embodiments.

For convenience in illustration, in FIG. 8A, mesh lines are not illustrated, and in FIGS. 8A and 8B, a solid line is used to depict a cutting line CL cutting the mesh lines. Also, in FIG. 8B, the cutting lines are depicted by thick black lines for easy differentiation from the mesh lines, and in FIG. 8C, the auxiliary electrode IMP-2_1 is illustrated as a black shading pattern. In FIG. 9, only the auxiliary electrode IMP-2_1 is illustrated.

Hereinafter, an electronic device according to some exemplary embodiments will be described with respect to FIGS. 8A, 8B, 8C, and 9. For concise description, an element previously described with reference to FIGS. 1 to 7D may be identified by a similar or identical reference number without repeating an overlapping description thereof.

A plurality of the auxiliary electrodes IMP-2_1, IMP-2_2, IMP-2_3, and IMP-2_4 may be provided between the left first sensor electrode SP1-2_A and the right first sensor electrode SP1-2_B, which are connected to each other in the first direction DR1, and between the upper second sensor electrode SP2-2_A and the lower second sensor electrode SP2-2_B, which are connected to each other in the second direction DR2. The auxiliary electrodes IMP-2_1, IMP-2_2, IMP-2_3, and IMP-2_4 may include the first to fourth auxiliary electrodes IMP-2_1, IMP-2_2, IMP-2_3, and IMP-2_4, which are arranged in a clockwise direction.

Referring to FIG. 8B, similar to the sensor electrodes SP1-2_A, SP1-2_B, SP2-2_A, and SP2-2_B, the first to fourth auxiliary electrodes IMP-2_1, IMP-2_2, IMP-2_3, and IMP-2_4 may also consist of a plurality of the mesh lines MSL. In FIG. 8B, a portion of the first auxiliary electrode IMP-2_1 is exemplarily illustrated.

Boundaries of the sensor electrodes SP1-2_A, SP1-2_B, SP2-2_A, and SP2-2_B and the first to fourth auxiliary electrodes IMP-2_1, IMP-2_2, IMP-2_3, and IMP-2_4 may be defined by the cutting line CL. The cutting line CL may be a line connecting centers of two openings, which are adjacent to each other with a predetermined mesh line interposed therebetween. The cutting line CL may cut the mesh lines crossing an extension direction thereof.

Accordingly, the cutting line CL may include segments extending in an extension direction of the first mesh lines MSL1 or the second mesh lines MSL2. The cutting line CL may be partially extended or bent in the third direction DR3 or the fourth direction DR4 to define sides of the first auxiliary electrode IML-2_1 including a plurality of protruding patterns.

Referring to FIGS. 8B and 8C, the cutting line CL may define sides of each of the first to fourth auxiliary electrodes IMP-2_1, IMP-2_2, IMP-2_3, and IMP-2_4 and may define boundary sides of each of the sensor electrodes SP1-2_A, SP1-2_B, SP2-2_A, and SP2-2_B. For instance, the cutting line CL shown in FIG. 8B may be portions of two sides of the first auxiliary electrode IMP-2_1, a portion of the boundary side of the upper second sensor electrode SP2-2_A, and a portion of the boundary side of the right first sensor electrode SP1-2_B.

According to some exemplary embodiments, the minimum width of the first auxiliary electrode IMP-2_1 may correspond to that of one of the openings TS-OP (e.g., see FIG. 7A) defined by the mesh lines. This may be substantially the minimum distance between the upper second sensor electrode SP2-2_A and the right first sensor electrode SP1-2_B. As described above, the opening TS-OP may correspond to a pixel region. Accordingly, a distance between the upper second sensor electrode SP2-2_A and the right first sensor electrode SP1-2_B may be greater than a size of the pixel region.

Referring to FIG. 9, the first auxiliary electrode IML-2_1 may include a first side S1-M facing the boundary side of the right first sensor electrode SP1-2_B and a second side S2-M facing the boundary side of the upper second sensor electrode SP2-2_A. The first side S1-M and the second side S2-M may be asymmetric in shape with respect to the center axis CX.

Each of the first side S1-M and the second side S2-M may include a plurality of protruding patterns. The first side S1-M may include first protruding patterns RP-M_S1 that are sequentially arranged with a first pitch PT1-M, and the second side S2-M may include second protruding patterns RP-M_S2 that are sequentially arranged with a second pitch PT2-M.

The first pitch PT1-M and the second pitch PT2-M may be different from each other. In some exemplary embodiments, the first pitch PT1-M is illustrated to be larger than the second pitch PT2-M.

The first protruding patterns RP-M_S1 and the second protruding patterns RP-M_S2 may have shapes different from each other. In some exemplary embodiments, each of the first protruding patterns RP-M_S1 is exemplarily illustrated to have an area larger than that of each of the second protruding patterns RP-M_S2. Accordingly, the first portion P1-4 and the second portion P2-4 may be asymmetric in terms of their shape, and as seen in FIG. 9, the first portion P1-4 may have an area larger than that of the second portion P2-4.

According to some exemplary embodiments, an area of each of the first sensor electrodes SP1-2_A and SP1-2_B may be larger than that of each of the second sensor electrodes SP2-2_A and SP2-2_B. In the case where the active region AA (e.g., see FIG. 1) of the electronic device has a rectangular shape defined by a relatively long side and a relatively short side (e.g., parallel to long and short axes, respectively), the first sensor electrodes SP1-2_A and SP1-2_B may be arranged in a direction of the short axis and may be electrodes arranged along the second sensor electrodes SP2-2_A and SP2-2_B. In the electronic device according to some exemplary embodiments, positions and shapes of the auxiliary electrodes IMP-2_1, IMP-2_2, IMP-2_3, and IMP-2_4 may be designed in such a way that an area of each of the first sensor electrodes SP1-2_A and SP1-2_B is larger than that of each of the second sensor electrodes SP2-2_A and SP2-2_B, and thus, it may be possible to realize a uniform sensing area in a direction of a long axis or a short axis.

According to some exemplary embodiments, the electronic device may include auxiliary electrodes having various shapes. Also, the auxiliary electrodes may include a plurality of mesh lines, and in some exemplary embodiments, shapes of the auxiliary electrodes and the sensor electrodes may be designed using the cutting lines CL provided to cut the mesh lines.

In some exemplary embodiments, since the auxiliary electrodes include the mesh lines, the auxiliary electrodes may be applied to a flexible electronic device and may be used to realize an equivalent effect. In the case where the auxiliary electrodes have an asymmetric shape, the auxiliary electrodes may be realized in various shapes and in various structures, but the inventive concepts are not limited thereto.

Figure 10:
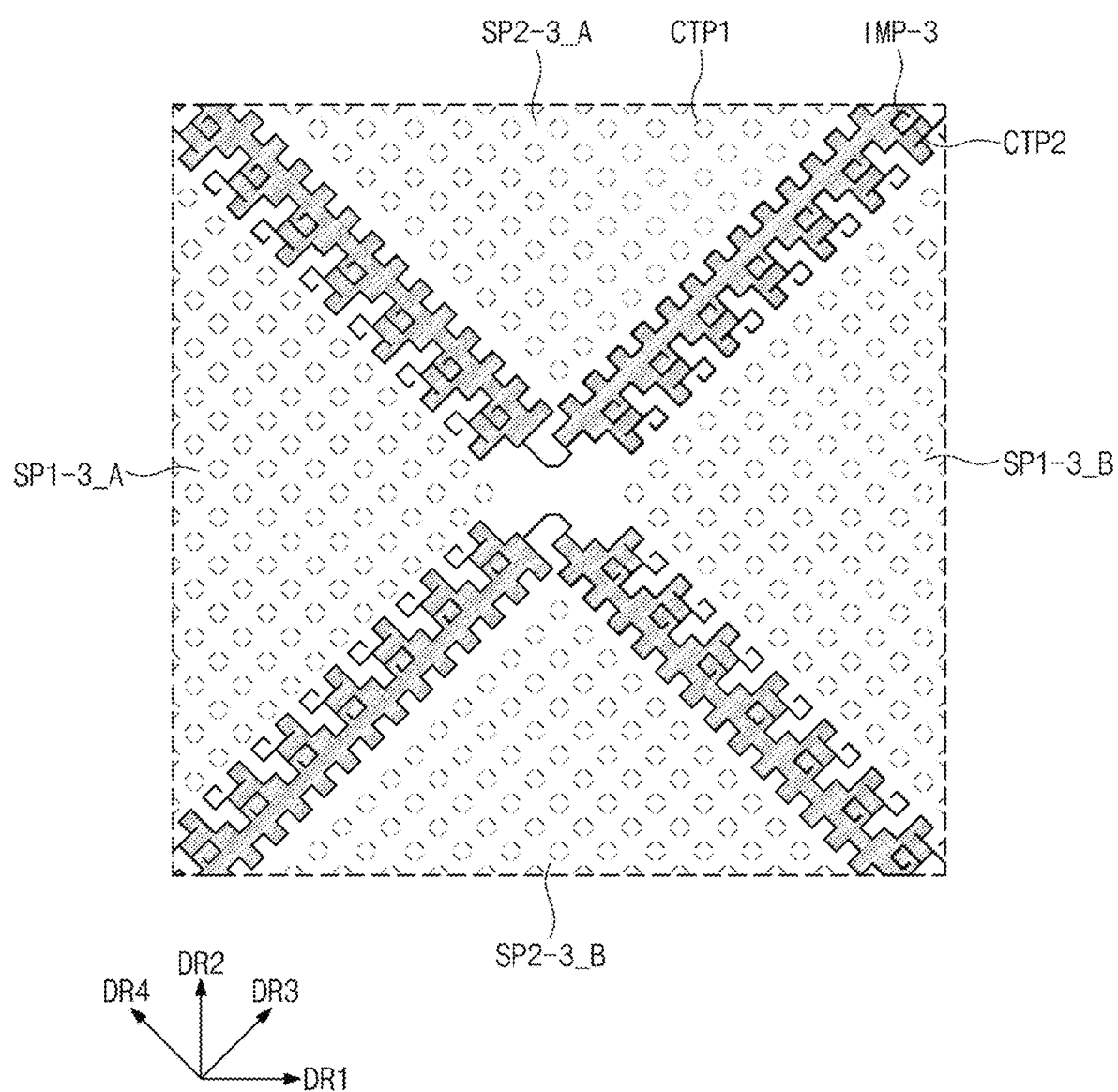
FIG. 10 is an enlarged plan view illustrating a region of an electronic device according to some exemplary embodiments.

FIG. 10 is an enlarged plan view illustrating a region of an electronic device according to some exemplary embodiments. For convenience in illustration, in FIG. 10, the mesh lines are not illustrated, and a solid line is used to depict cutting lines that cut the mesh lines. In addition, for easy differentiation from the sensor electrodes SP1-3_A, SP1-3_B, SP2-3_A, and SP2-3_B, shading patterns are used to depict auxiliary electrodes IMP-3.

Hereinafter, an electronic device according to some exemplary embodiments will be described with respect to FIG.

10. For the sake of brevity, elements and features that are similar to those previously shown and described with reference to FIGS. 1 to 9 will not be described in much further detail.

As shown in FIG. 10, the sensor electrodes may further include first cutting patterns CTP1. The first cutting patterns CTP1 may be formed by cutting segments spaced apart from each other. The first cutting patterns CTP1 may not form isolated floating patterns. As such, in the sensor electrodes SP1-3_A, SP1-3_B, SP2-3_A, and SP2-3_B, some of the mesh lines may have a region that is partially and additionally cut, but a change in area of a sensor having a conductive property may not be large.

The auxiliary electrodes IMP-3 may further include second cutting patterns CTP2. The second cutting patterns CTP2 may also form partially-cut mesh lines, but a change in total area of the auxiliary electrodes IMP-3 may not be large.

According to some exemplary embodiments, the electronic device may further include a plurality of cutting patterns CTP1 and CTP2, which makes it difficult for a user to recognize boundaries between the sensor electrodes SP1-3_A, SP1-3_B, SP2-3_A, and SP2-3_B and the auxiliary electrodes IMP-3. The more similar the shapes or arrangements of the first cutting patterns CTP1 and the second cutting patterns CTP2 is to a shape of sides of each of the auxiliary electrodes IMP-3, the more difficult it is to distinguish the sensor electrodes SP1-3_A, SP1-3_B, SP2-3_A, and SP2-3_B from the auxiliary electrodes IMP-3. Thus, in the electronic device according to one or more exemplary embodiments, it may be possible to suppress or prevent the sensor electrodes SP1-3_A, SP1-3_B, SP2-3_A, and SP2-3_B from being recognized by reflection of external light.

Figure 11A:
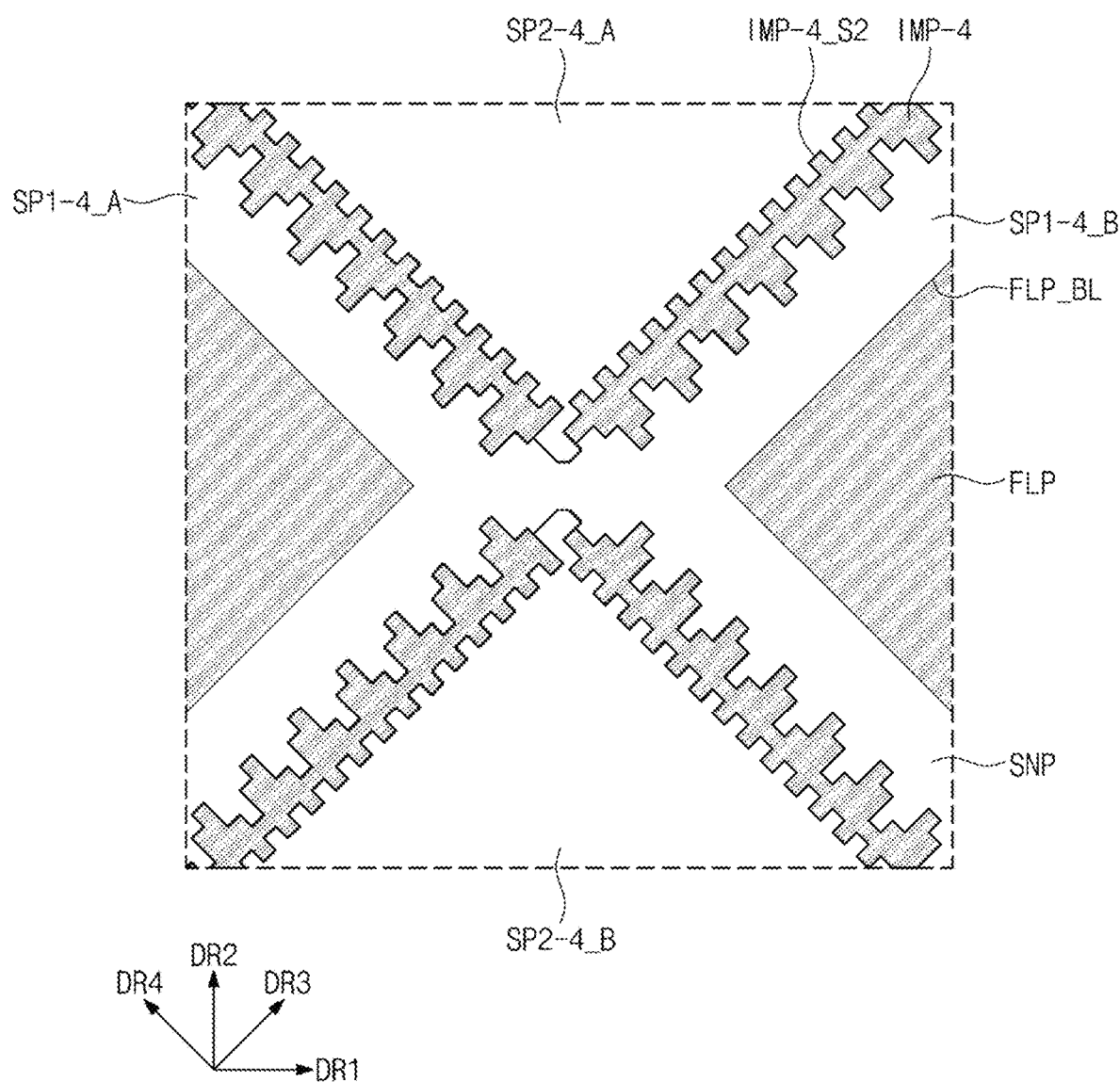
FIGS. 11A, 11B, and 11C are enlarged plan views illustrating a region of an electronic device according to some exemplary embodiments.
Figure 11B:
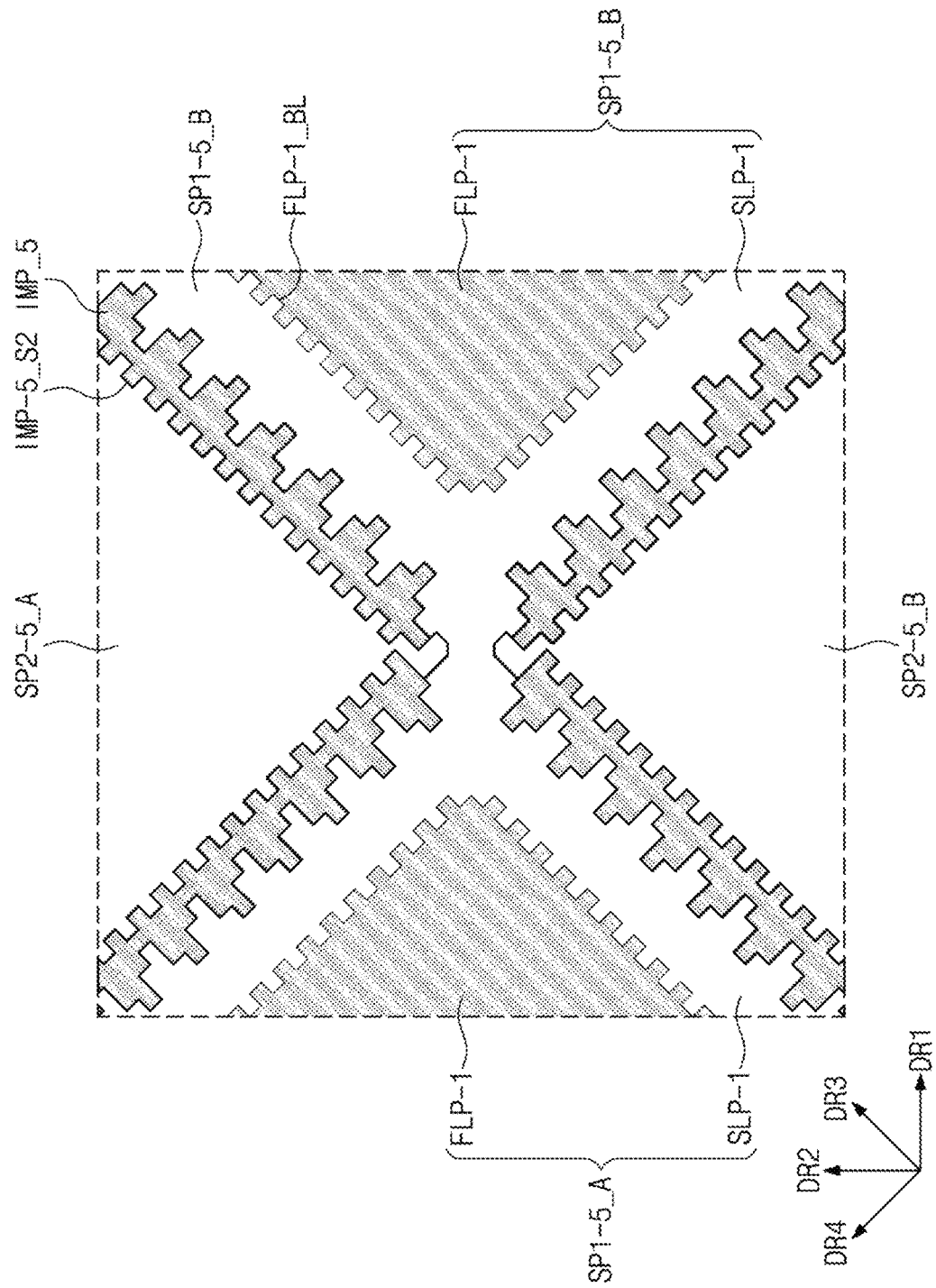
Figure 11C:
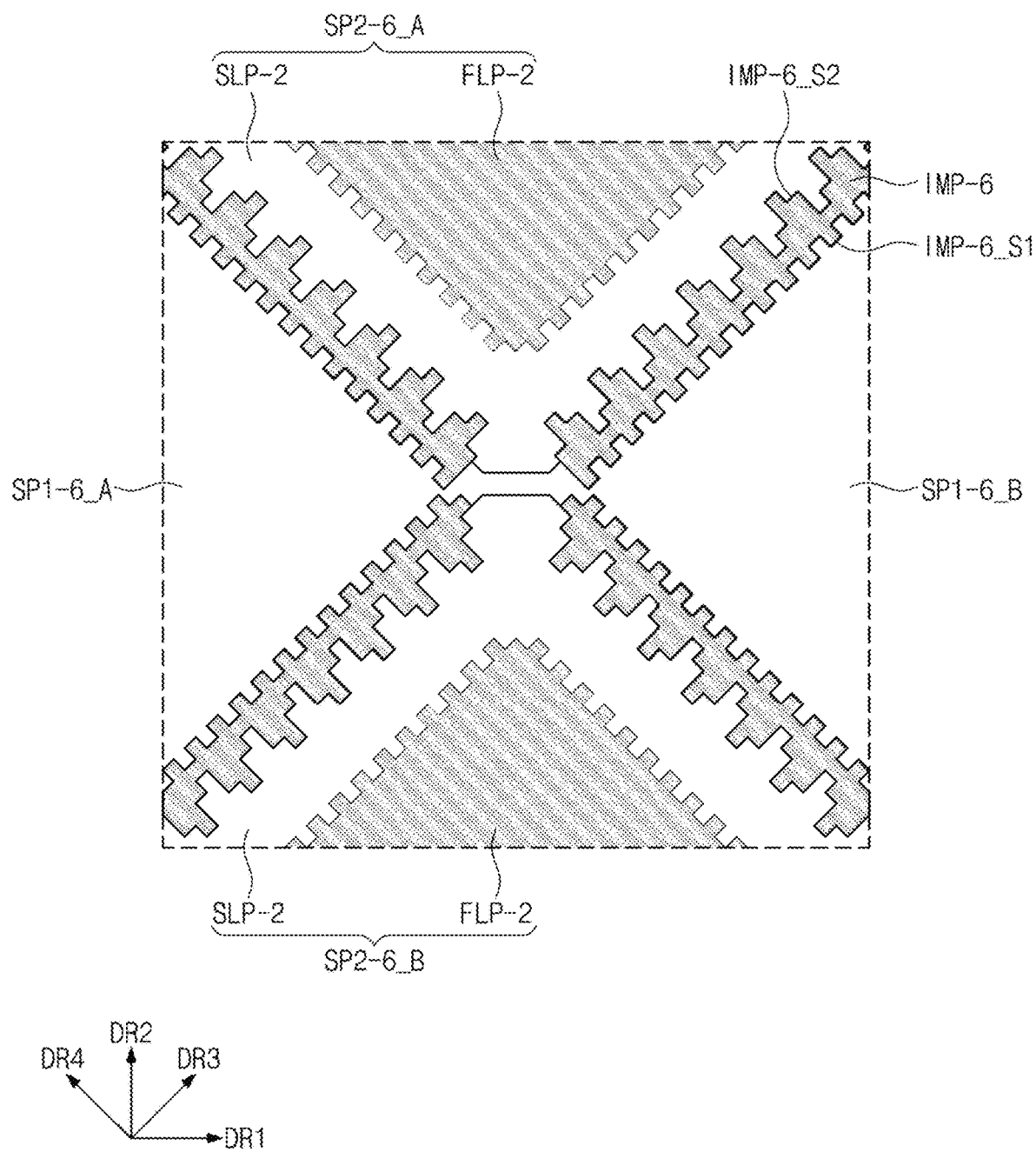

FIGS. 11A to 11C are enlarged plan views illustrating a region of an electronic device according to some exemplary embodiments. For convenience in illustration and description, FIGS. 11A to 11C illustrate a region corresponding to that of FIG. 8A. Hereinafter, an electronic device according to various exemplary embodiments will be described with respect to FIGS. 11A to 11C. For the sake of brevity, the elements and features that are similar to those previously shown and described with reference to FIGS. 1 to 10B will not be described in much further detail.

As shown in FIG. 11A, at least one of the sensor electrodes may further include a floating pattern FLP. For instance, one group, which are selected from the first sensor electrodes SP1-4_A and SP1-4_B and the second sensor electrodes SP2-4_A and SP2-4_B may include the floating pattern FLP, and the other group of the sensor electrodes may not include the floating pattern FLP. In other words, the floating pattern FLP may be asymmetrically provided in either group of the first sensor electrodes SP1-4_A and SP1-4_B and the second sensor electrodes SP2-4_A and SP2-4_B.

As seen in FIG. 11A, each of a left first sensor electrode SP1-4_A and a right first sensor electrode SP1-4_B may include the floating pattern FLP. Accordingly, an effective sensor area of each of the left first sensor electrode SP1-4_A and the right first sensor electrode SP1-4_B may be reduced by an area of the floating pattern FLP.

Each of a left first sensor electrode SP1-4_A and a right first sensor electrode SP1-4_B may be divided into the floating pattern FLP and a sensor part SNP. An effective sensor area of each of the left first sensor electrode SP1-4_A and the right first sensor electrode SP1-4_B may be substantially equal to a total area of the sensor part SNP.

Each of an upper second sensor electrode SP2-4_A and a lower second sensor electrode SP2-4_B may not include the floating pattern FLP. Thus, each of the upper second sensor electrode SP2-4_A and the lower second sensor electrode SP2-4_B may have a single body shape. Accordingly, an effective sensing area of each of the upper second sensor electrode SP2-4_A and the lower second sensor electrode SP2-4_B may correspond to a total area of each of the upper second sensor electrode SP2-4_A and the lower second sensor electrode SP2-4_B.

Meanwhile, the substantial sensor area of each of the left first sensor electrode SP1-4_A and the right first sensor electrode SP1-4_B may be substantially equal to an area of each of the upper second sensor electrode SP2-4_A and the lower second sensor electrode SP2-4_B. In the electronic device according to some exemplary embodiments, the floating patterns FLP may be provided to be asymmetric with respect to adjacent ones of the sensor electrodes, and thus, it may be possible to equalize areas of two adjacent ones of the sensor electrodes.

The floating pattern FLP shown in FIG. 11A may have a border FLP_BL extending in the third direction DR3 or the fourth direction DR4 and having a straight line shape. Here, the border FLP_BL of the floating pattern FLP may have a shape different from that of a second side IMP-4_S2 of an auxiliary electrode IMP-4.

Alternatively, as shown in FIG. 11B, the electronic device may include the floating pattern FLP-1 including a border FLP-1_BL having a plurality of protruding patterns. In this manner, each of the left and right first sensor electrodes SP1-5_A and SP1-5_B may be divided into a sensor part SLP-1 and the floating pattern FLP-1 by the border FLP-1_BL of the floating pattern FLP-1.

A shape of the border FLP-1_BL of the floating pattern FLP-1 may correspond to one of two sides of an auxiliary electrode pattern IMP-5. As seen in FIG. 11B, the shape of the border FLP-1_BL of the floating pattern FLP-1 may have a shape corresponding to a second side IMP-5_S2 facing the upper second sensor electrode SP2-5_A adjacent thereto. Accordingly, it may be possible to reduce a visibility issue between the floating pattern FLP-1, the sensor electrodes SP1-5_A, SP1-5_B, SP2-5_A, and SP2-5_B, and the auxiliary electrode IMP_5.

As shown in FIG. 11C, a floating pattern FLP-2 may be provided in association with the upper and lower second sensor electrodes SP2-6_A and SP2-6_B. Accordingly, each of the upper and lower second sensor electrodes SP2-6_A and SP2-6_B may be divided into a sensor part SLP-2 and the floating pattern FLP-2.

According to some exemplary embodiments, an auxiliary electrode IMP-6 may be provided to be closer to the first sensor electrodes SP1-6_A and SP1-6_B than to the second sensor electrodes SP2-6_A and SP2-6_B. A degree of protrusion of a first side IMP-6_S1 of the auxiliary electrode IMP-6 toward a right first sensor electrode SP1-6_B may be greater than (or smaller than) that of a second side IMP-6_S2 of the auxiliary electrode IMP-6 toward an upper second sensor electrode SP2-6_A.

Areas of the upper and lower second sensor electrodes SP2-6_A and SP2-6_B may substantially correspond to areas of the sensor parts SLP-2. An area of each of the sensor parts SLP-2 may be substantially equal to an area of each of the left and right first sensor electrodes SP1-6_A and SP1-6_B. However, the inventive concepts are not limited to these examples, and a position and a shape of the auxiliary electrode IMP-6 may be variously changed.

According to one or more exemplary embodiments, the electronic device may include floating patterns provided at various positions, and thus, it may be possible to design various sensor electrodes. The electronic device may include the floating patterns, which are selectively provided in association with one of two adjacent groups of the sensor electrodes (e.g., in association with the first sensor electrodes or in association with the second sensor electrodes), and thus, adjacent ones of the sensor electrodes may be designed to have the same sensing area or a desired area ratio. Thus, according to some exemplary embodiments, the sensor electrodes can be designed to have various sensing area ratios.

Figure 12:
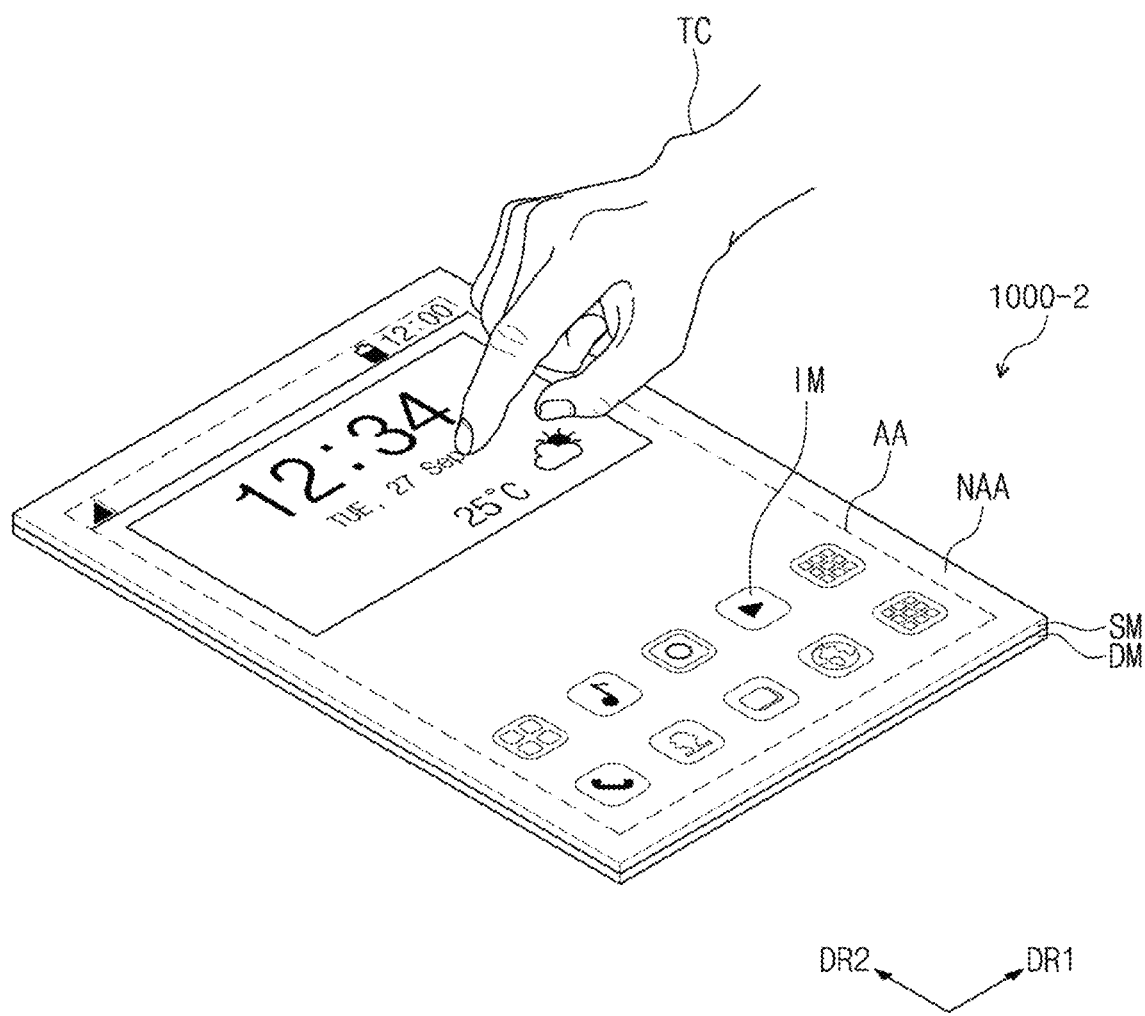
FIG. 12 is a perspective view illustrating an electronic device according to some exemplary embodiments.
Figure 13A:
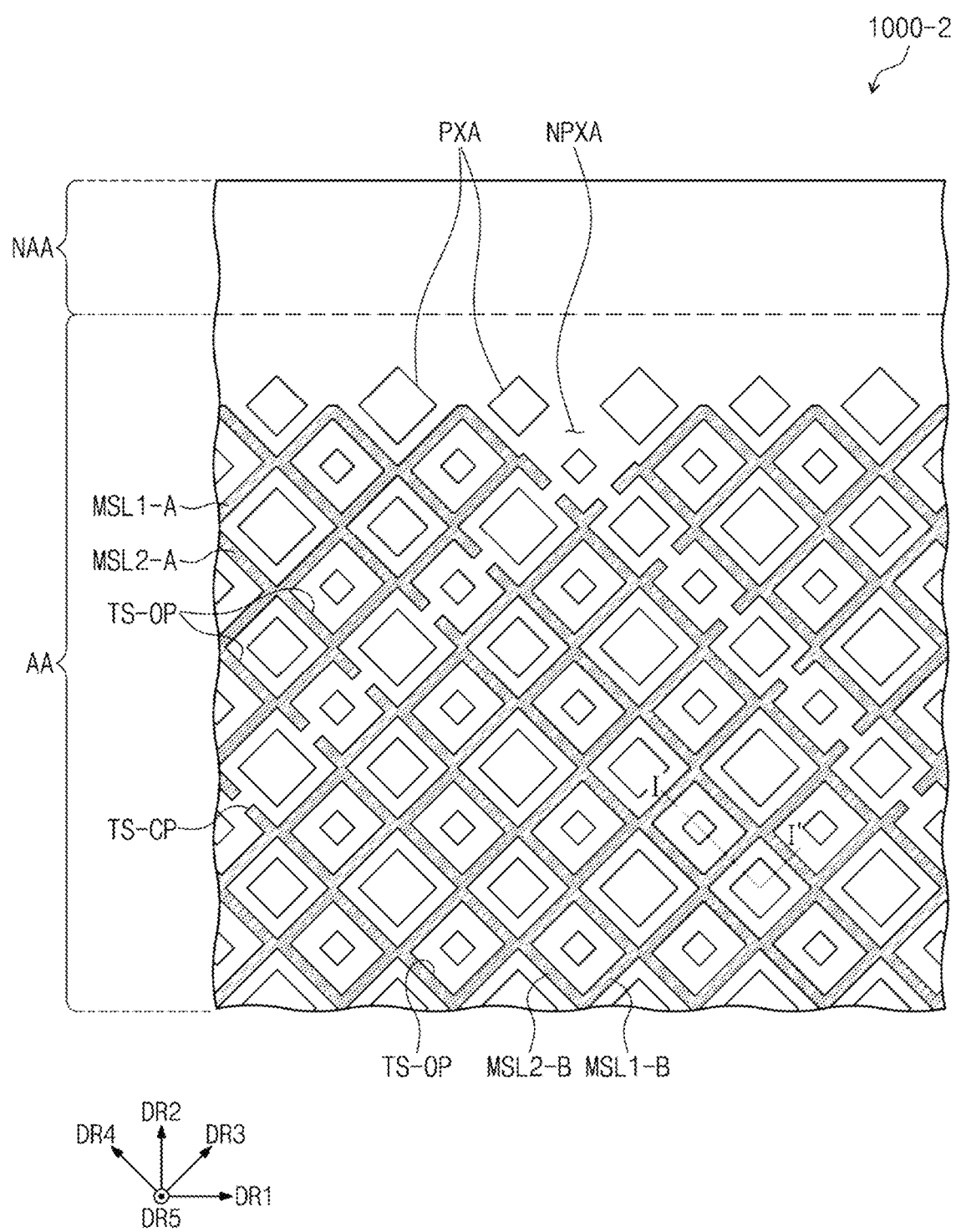
FIG. 13A is an enlarged plan view illustrating a region of the electronic device shown in FIG. 12 according to some exemplary embodiments.
Figure 13B:
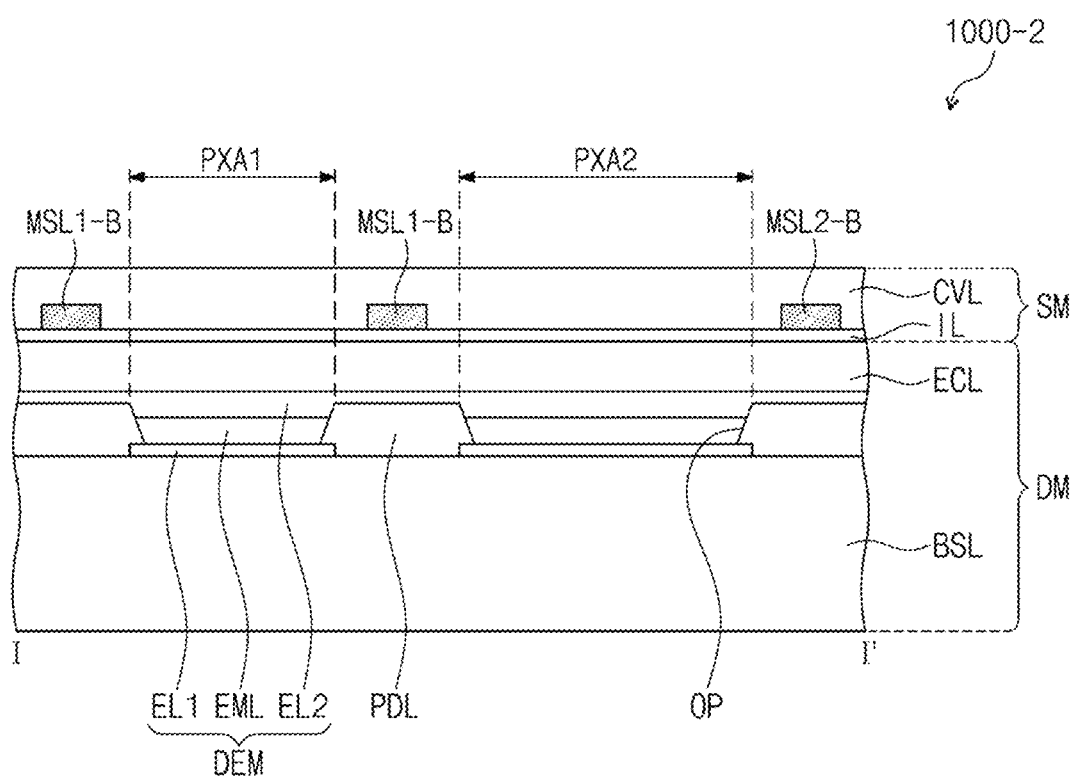
FIG. 13B is a sectional view taken along sectional line I-I' of FIG. 13A according to some exemplary embodiments.

FIG. 12 is a perspective view illustrating an electronic device according to some exemplary embodiments. FIG. 13A is an enlarged plan view illustrating a region of the electronic device shown in FIG. 12 according to some exemplary embodiments. FIG. 13B is a sectional view taken along sectional line I-I' of FIG. 13A according to some exemplary embodiments. Hereinafter, an electronic device according to some exemplary embodiments will be described with respect to FIGS. 12 to 13B. For concise description, an element previously described with reference to FIGS. 1 to 11C may be identified by a similar or identical reference number without repeating an overlapping description thereof.

As shown in FIG. 12, an electronic device 1000-2 may be configured to sense the touch TC applied from the outside and to provide the active region AA for displaying an image IM. In one or more exemplary embodiments, the electronic device 1000-2 may be a touch screen device.

Referring to FIGS. 13A and 13B, the electronic device 1000-2 may include a display member DM and a sensing member SM. The display member DM may be configured to display the image IM in response to an electrical signal applied thereto. The display member DM may include a base layer BSL, a display device DEM, and an encapsulation layer ECL.

The base layer BSL may be a base layer in which the display device DEM is provided. In one or more exemplary embodiments, the base layer BSL may be at least one of a glass substrate, a plastic substrate, a silicon substrate, and an insulating film. In some exemplary embodiments, although not shown, the base layer BSL may include a plurality of driving devices. Accordingly, the base layer BSL may include a plurality of insulating layers and a plurality of conductive layers.

The display device DEM may be provided on the base layer BSL. The display device DEM may be connected to the driving device. The display device DEM may include various devices capable of displaying the image IM. For example, the display device DEM may include at least one of a liquid crystal capacitor, an organic light emitting device, an electrophoresis device, or an electrowetting device. As seen in FIG. 13B, an example in which an organic light emitting device is used as the display device DEM is exemplarily illustrated, but the inventive concepts are not limited thereto.

The display device DEM may include a first electrode layer EL1, a light emitting layer EML, and a second electrode layer EL2. The display device DEM may be configured to excite the light emitting layer EML using a potential difference between the first electrode layer EL1 and the second electrode layer EL2, and, thereby, to generate light.

A pixel definition layer PDL, in which a plurality of openings OP are defined, may be provided on the base layer BSL. The openings OP may define pixel regions PXA. The light emitting layer EML may include a plurality of light-emitting patterns provided in the pixel regions PXA, respectively.

In FIG. 13B, two pixel regions PXA1 and PXA2, which are two adjacent ones of the pixel regions PXA, are exemplarily illustrated. The two pixel regions PXA1 and PXA2 may have areas different from each other, when viewed in a plan view. In one or more exemplary embodiments, the two pixel regions PXA1 and PXA2 may be used to display lights of different colors.

The sensing member SM may be provided on the display member DM, but the inventive concepts are not limited to this example, and in some exemplary embodiments, the sensing member SM may be provided below the display member DM or on the base layer BSL of the display member DM. That is, the position of the sensing member SM may be variously changed.

The sensing member SM may be configured to sense the touch TC. The sensing member SM may correspond to the touch structure 200 of FIG. 2. The sensing member SM may include an insulating layer IL, a plurality of mesh lines MSL1-A, MSL1-B, MSL2-A, and MSL2-B, a cover layer CVL Although not shown, conductive patterns may be provided between the insulating layer IL and the encapsulation layer ECL. The conductive patterns may correspond to the second connecting portion CP2-1 (e.g., see FIG. 7B).

The insulating layer IL may be provided to electrically separate a conductive pattern including the second connecting portion CP2-1 from the plurality of mesh lines MSL1-A, MSL1-B, MSL2-A, and MSL2-B. The second connecting portion CP2-1 may be connected to at least one of the plurality of mesh lines MSL1-A, MSL1-B, MSL2-A, and MSL2-B through contact holes (not shown), which are formed to pass through the insulating layer IL.

The cover layer CVL may be provided on the plurality of mesh lines MSL1-A, MSL1-B, MSL2-A, and MSL2-B to protect the plurality of mesh lines MSL1-A, MSL1-B, MSL2-A, and MSL2-B. The cover layer CVL may include at least one insulating layer.

Referring back to FIG. 13A, the plurality of mesh lines MSL1-A, MSL1-B, MSL2-A, and MSL2-B may be arranged to cross each other, thereby defining the openings TS-OP. The openings TS-OP may be defined at positions corresponding to the pixel regions PXA, and each of the openings TS-OP may be defined to have an area larger than that of each of the pixel regions PXA. The inventive concepts, however, are not limited to this example, and at least one of the plurality of mesh lines MSL1-A, MSL1-B, MSL2-A, and MSL2-B may be provided to be overlapped with at least a portion of the pixel regions PXA.

At least one of the plurality of mesh lines MSL1-A, MSL1-B, MSL2-A, and MSL2-B may include the cut portion TS-CP. The cut portion TS-CP may be formed by the cutting line CL (e.g., see FIG. 8B). The plurality of mesh lines MSL1-A, MSL1-B, MSL2-A, and MSL2-B may constitute each of the first sensor electrode, the second sensor electrode, and the auxiliary electrode pattern by the cut portion TS-CP.

According to one or more exemplary embodiments, the electronic device 1000-2 may be configured to display an image IM and sense the touch TC applied from the outside. Thus, it may be possible to expand the availability of the electronic device 1000-2.

Figure 14A:
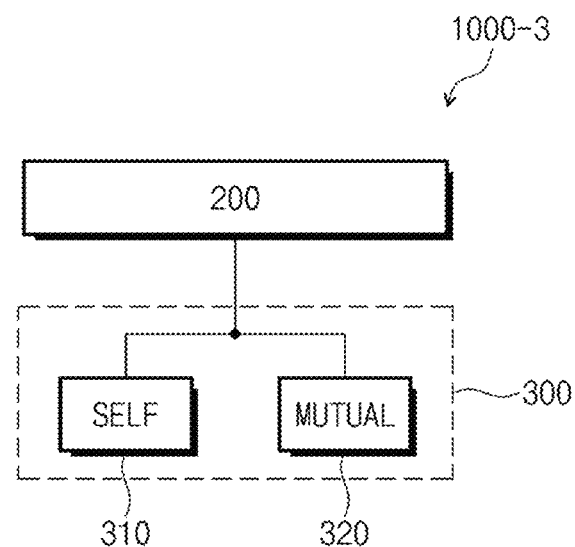
FIG. 14A is a block diagram schematically illustrating an electronic device according to some exemplary embodiments.
Figure 14B:
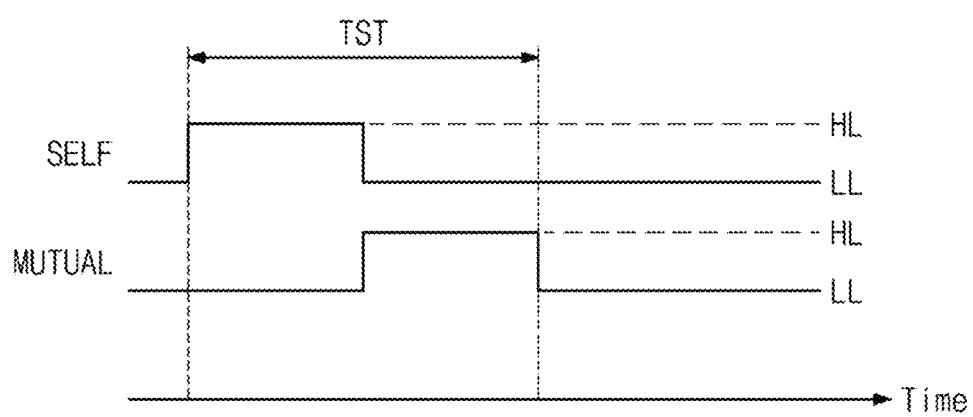
FIG. 14B is a timing diagram illustrating a variation of a driving signal for operating the electronic device shown in FIG. 14A according to some exemplary embodiments.
Figure 15A:
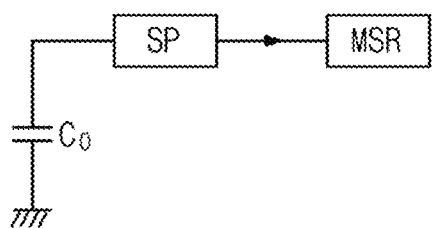
FIGS. 15A and 15B are block diagrams illustrating an operation of an electronic device in a mode according to some exemplary embodiments.
Figure 15B:
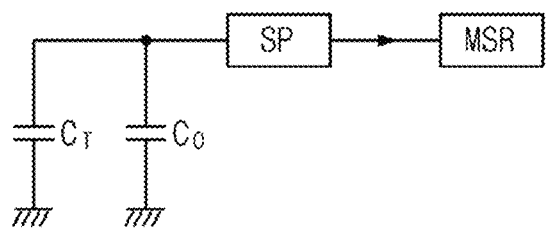
Figure 16A:
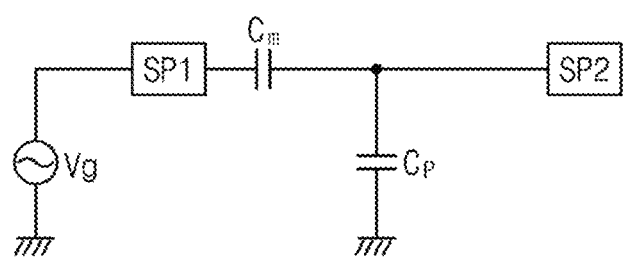
FIGS. 16A and 16B are block diagrams illustrating an operation of an electronic device in a mode according to some exemplary embodiments.
Figure 16B:
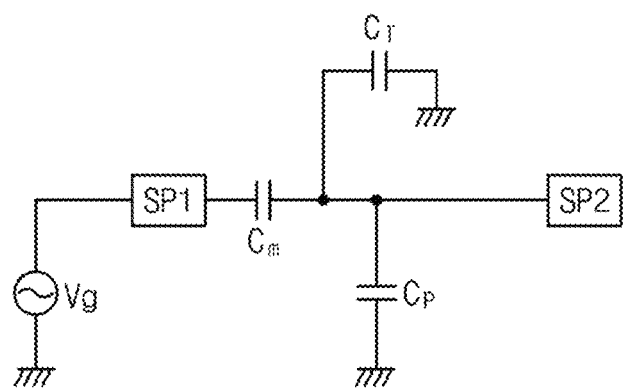

FIG. 14A is a block diagram schematically illustrating an electronic device according to some exemplary embodiments. FIG. 14B is a timing diagram illustrating a variation of a driving signal for operating the electronic device shown in FIG. 14A according to some exemplary embodiments. FIGS. 15A and 15B are block diagrams illustrating an operation of an electronic device in a mode according to some exemplary embodiments. FIGS. 16A and 16B are block diagrams illustrating an operation of an electronic device in a mode according to some exemplary embodiments. Hereinafter, an electronic device according to some exemplary embodiments will be described with respect to FIGS. 14A to 16B. For concise description, an element previously described with reference to FIGS. 1 to 13B may be identified by a similar or identical reference number without repeating an overlapping description thereof.

As shown in FIG. 14A, an electronic device 1000-3 may include a driving circuit 300 including a first driving part 310 and a second driving part 320. The first driving part 310 may be configured to operate the touch structure 200 in a self-capacitance mode, and the second driving part 320 may be configured to operate the touch structure 200 in a mutual-capacitance mode.

As shown in FIG. 14B, the first driving part 310 and the second driving part 320 may be alternately driven during a referent time interval TST, which is allocated for a touch sensing operation. During the referent time interval TST, a self-capacitance sensing signal SELF of a high level HL may be applied to the first driving part 310 to execute a mode for sensing a self-capacitance signal. Here, the touch structure 200 may sense the touch TC in the self-capacitance mode. During the referent time interval TST, a mutual capacitance sensing signal MUTUAL of a high level HL may be applied to the second driving part 320 to execute a mode for sensing a mutual-capacitance signal. Here, the touch structure 200 may sense the touch TC in the mutual-capacitance mode.

FIGS. 15A and 15B illustrate a process of sensing the touch TC using the touch structure 200 in a self-capacitance mode. As shown in FIG. 15A, if the first driving part 310 is activated, the first and second sensor electrodes of the touch structure 200 may be synchronized as one sensor electrode SP. Here, the sensor electrode SP may have a base capacitance CO with respect to a predetermined ground terminal having the ground voltage. Capacitance of the sensor electrode SP measured by a measurement module MSR may be the base capacitance CO.

Next, if the touch TC is applied from the outside, an additional capacitor having a touch capacitance CT may be formed between the touch TC and the ground terminal, as shown in FIG. 15B. In this case, the capacitance measured by the measurement module MSR may be a sum of the touch capacitance CT and the base capacitance CO. In the self-capacitance mode, the first driving part 310 may sense which of the sensor electrodes has increased capacitance (i.e., where the touch TC occurred).

FIGS. 16A and 16B illustrate a process of sensing the touch TC using the touch structure 200 in a mutual-capacitance mode. As shown in FIG. 16A, if the second driving part 320 is activated, one of the first and second sensor electrodes of the touch structure 200 may be used to receive a driving signal, and the other may be used to output a sensing signal. In other words, the first and second sensor electrodes SP1 and SP2 may be operated with different electrical signals.

For example, if a predetermined driving power Vg is applied to the first sensor SP1 in the mutual-capacitance mode, a capacitor having a base capacitance Cm may be formed between the first and second sensors SP1 and SP2. In addition, owing to the ground terminal, a parasitic capacitor having a parasitic capacitance Cp may be further formed.

Next, as shown in FIG. 16B, if the touch TC is applied from the outside, an additional capacitor having a touch capacitance CT may be formed between the touch TC and the ground terminal. Here, the capacitors having the touch and base capacitances CT and Cm may be connected in parallel to each other. Accordingly, capacitance measured by the measurement module MSR may be smaller than the base capacitance Cm. In the mutual-capacitance mode, the second driving part 320 may sense which of the sensor electrodes has lowered capacitance (i.e., where the touch TC occurred).

According to various exemplary embodiments, the electronic device may be operated in both of the self and mutual-capacitance modes, and this makes it possible to improve sensitivity in such a touch sensing operation and sensibility of multi-touch events.

Furthermore, when the electronic device is operated in the self-capacitance mode, operational characteristics of the electronic device may be strongly affected by areas of the sensor electrodes. According to one or more exemplary embodiments, the electronic device may be designed to allow the first and second sensors to have the same total area. Accordingly, it may be possible to prevent touch sensitivity of the electronic device from being deteriorated by a difference in horizontal and vertical lengths. Also, it may be possible to stably operate the electronic device in the self-capacitance mode regardless of a shape of the electronic device, and, thus, an additional correction circuit for correcting a difference in area between the first and second sensors may be omitted. This makes it possible to simplify a fabrication process, as well as reduce the cost of manufacturing the electronic device.

According to one or more exemplary embodiments, even when a sensor is deformed by a change in shape of an electronic device, it is possible to maintain high touch sensitivity and to provide a stable touch environment for a user. Furthermore, according to one or more exemplary embodiments, it is possible to prevent a boundary between sensors, which are used to sense an external touch, from being easily recognized by a user through reflection of external light.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. An electronic device, comprising:
   a display member comprising light emitting elements; and
   a sensing layer disposed on the display member, the sensing layer comprising:
   a first mesh electrode including a plurality of first protruding patterns;
   a second mesh electrode including a plurality of second protruding patterns, and spaced apart from the first mesh electrode in a first direction; and
   a third mesh electrode between the first mesh electrode and the second mesh electrode, and insulated from and spaced apart from the first mesh electrode and the second mesh electrode,
   wherein each of the first mesh electrode, the second mesh electrode, and the third mesh electrode comprises:

a plurality of first mesh lines each extending in a second direction crossing the first direction and spaced apart along the first direction; and a plurality of second mesh lines each extending in the first direction and spaced apart along the second direction, wherein each of the plurality of first protruding patterns protrudes toward the second mesh electrode, and each of the plurality of second protruding patterns protrudes toward the first mesh electrode, wherein the plurality of first protruding patterns and the plurality of second protruding patterns have shapes different from each other, and wherein at least one of the plurality of first or second mesh lines of the third mesh electrode is located between a first protruding pattern and a second protruding pattern facing each other from among the first and second protruding patterns.

2. The electronic device of claim 1, wherein a width of each of the plurality of first protruding patterns in the second direction is different from a width of each of the plurality of second protruding patterns in the second direction.

3. The electronic device of claim 1, wherein a length of each of the plurality of first protruding patterns in the first direction is different from a length of each of the plurality of second protruding patterns in the first direction.

4. The electronic device of claim 1, wherein an area of each of the plurality of first protruding patterns is different from an area of each of the plurality of second protruding patterns.

5. The electronic device of claim 1, wherein the plurality of first protruding patterns have a first pitch, and the plurality of second protruding patterns have a second pitch different from the first pitch.

6. The electronic device of claim 1, wherein a number of second mesh lines included in each of the plurality of first protruding patterns and a number of second mesh lines included in each of the plurality of second protruding patterns are different from each other.

7. The electronic device of claim 1, wherein a width of the third mesh electrode in the first direction is variable along the second direction.

8. The electronic device of claim 1, wherein the third mesh electrode further comprises:

a plurality of third protruding patterns, each of which protrudes toward the first mesh electrode and is disposed between adjacent first protruding patterns among the plurality of first protruding patterns; and a plurality of fourth protruding patterns, each of which protrudes toward the second mesh electrode and is disposed between adjacent second protruding patterns among the plurality of second protruding patterns.

9. The electronic device of claim 8, wherein the plurality of third protruding patterns and the plurality of fourth protruding patterns have shapes different from each other.

10. The electronic device of claim 8, wherein:

a separation distance between the first protruding patterns adjacent to each other is smaller than a separation distance between the second protruding patterns adjacent to each other; and a width of each of the plurality of third protruding patterns in the second direction is smaller than a width of each of the plurality of fourth protruding patterns in the second direction.

11. The electronic device of claim 8, wherein:

the third mesh electrode is divided into a first portion including the plurality of third protruding patterns and a second portion including the plurality of fourth protruding patterns by a central axis extending along the second direction;

the central axis passes through centers of portions of the third mesh electrode having a minimum width in the first direction; and the first portion and the second portion have shapes that are asymmetric to each other with respect to the central axis.

12. The electronic device of claim 11, wherein:

an area of the first mesh electrode is larger than an area of the second mesh electrode; and an area of the first portion is smaller than an area of the second portion.

13. The electronic device of claim 1, wherein:

the plurality of second mesh lines of the first mesh electrode and the plurality of second mesh lines of the third mesh electrode facing each other are disconnected and spaced apart by a plurality of first cutting portions; and the plurality of second mesh lines of the second mesh electrode and the plurality of second mesh lines of the third mesh electrode facing each other are disconnected and spaced apart by a plurality of second cutting portions.

14. The electronic device of claim 1, wherein:

the plurality of first mesh lines of the first mesh electrode and the plurality of first mesh lines of the third mesh electrode facing each other are disconnected and spaced apart by a plurality of third cutting portions; and the plurality of first mesh lines of the second mesh electrode and the plurality of first mesh lines of the third mesh electrode facing each other are disconnected and spaced apart by a plurality of fourth cutting portions.

15. The electronic device of claim 1, wherein one of the first mesh electrode or the second mesh electrode comprises:

a sensor part adjacent to the third mesh electrode; and a floating pattern spaced apart from the third mesh electrode with the sensor part disposed therebetween, the floating pattern electrically disconnected from the sensor part.

16. The electronic device of claim 15, wherein an area of the sensor part of the one of the first mesh electrode or the second mesh electrode is substantially equivalent to an area of the other one of the first mesh electrode or the second mesh electrode.

17. The electronic device of claim 1, wherein:

the display member further comprises an encapsulation layer covering the light emitting elements;

the sensing layer further comprises an insulating layer disposed directly on the encapsulation layer; and the first mesh electrode and the second mesh electrode are disposed on the insulating layer.

18. The electronic device of claim 1, wherein:

the display member includes pixel regions in which lights respectively provided from the light emitting elements are displayed;

the plurality of first mesh lines and the plurality of second mesh lines are arranged to cross each other to define openings; and the openings are defined at positions corresponding to the pixel regions in a plan view.

19. The electronic device of claim 1, further comprising:

a self-capacitance measuring circuit configured to measure self-capacitance of each of the first mesh electrode and the second mesh electrode; and a mutual-capacitance measuring circuit configured to measure mutual-capacitance between the first mesh electrode and the second mesh electrode.

\* \* \* \* \*